United States Patent
Arutyunyan

(10) Patent No.: US 9,448,985 B2
(45) Date of Patent: Sep. 20, 2016

(54) BROWSER APPLICATION AND A METHOD OF OPERATING THE BROWSER APPLICATION

(71) Applicant: YANDEX EUROPE AG, Lucerne (CH)

(72) Inventor: Sarkis Araikovich Arutyunyan, Moscow Region (RU)

(73) Assignee: YANDEX EUROPE AG, Lucerne (CH)

(*) Notice: Subject to any disclaimer, the term of this patent is extended or adjusted under 35 U.S.C. 154(b) by 0 days.

(21) Appl. No.: 14/948,602

(22) Filed: Nov. 23, 2015

(65) Prior Publication Data

US 2016/0078011 A1  Mar. 17, 2016

Related U.S. Application Data

(63) Continuation of application No. PCT/IB2014/065791, filed on Nov. 4, 2014.

(30) Foreign Application Priority Data

Apr. 30, 2014  (RU) .................................. 2014117577

(51) Int. Cl.
*G06F 17/22* (2006.01)
*G06F 3/0483* (2013.01)
(Continued)

(52) U.S. Cl.
CPC ......... *G06F 17/2247* (2013.01); *G06F 3/0483* (2013.01); *G06F 3/04855* (2013.01); *G06F 17/30* (2013.01); *G06F 17/30994* (2013.01); *H04L 12/6418* (2013.01)

(58) Field of Classification Search
CPC ........... G06F 17/2235; G06F 17/2247; G06F 17/30884; G06F 3/0483; G06F 17/30994; G06F 3/0481
See application file for complete search history.

(56) References Cited

U.S. PATENT DOCUMENTS 5,986,657 A * 11/1999 Berteig .................. G06F 3/0481
715/792
6,380,957 B1 * 4/2002 Banning ............... G06F 3/0481
715/825

(Continued)

FOREIGN PATENT DOCUMENTS

EP      1058875 B1    10/2010
RU      2500026 C2    11/2009
WO   2013032717 A2     3/2013

OTHER PUBLICATIONS

International Search Report and Written Opinion from PCT/IB14//65791, Mar. 4, 2015, Shane Thomas.

*Primary Examiner* — Maikhanh Nguyen
(74) *Attorney, Agent, or Firm* — BCF LLP

(57) ABSTRACT

A method of displaying a web resource to a user in a browser application that is executed on an electronic device is provided. In response to the user requesting multiple web resources (i.e. a first web resource and a second web resource), the browser application displays a browser element tab, the browser element tab for controlling displaying of a first web resource and a second web resource within the browsing window, a browser element tab, the browser element tab having: a first browser element representative of the first web resource and a second browser element representative of the second web resource (if the web resources belong to different domains) and a unified browser element representative of the single domain (if the web resources belong to a single domain), the unified browser element being selectively collapsible and expandable.

23 Claims, 13 Drawing Sheets

(51) Int. Cl.
  *G06F 17/30* (2006.01)
  *H04L 12/64* (2006.01)
  *G06F 3/0485* (2013.01)

(56) References Cited

U.S. PATENT DOCUMENTS

| | | | | |
|---|---|---|---|---|
| 7,047,499 B2 * | 5/2006 | Ferri | ............... | G06F 3/0483 |
| | | | | 715/776 |
| 7,181,698 B2 * | 2/2007 | Shahrbabaki | ......... | G06F 3/0483 |
| | | | | 715/790 |
| 7,596,760 B2 * | 9/2009 | Sauve | ............... | G06F 3/0481 |
| | | | | 715/234 |
| 7,620,911 B2 * | 11/2009 | Webb | ............... | G06F 3/0481 |
| | | | | 715/795 |
| 7,673,233 B2 * | 3/2010 | Moore | ............ | G06F 17/30899 |
| | | | | 715/243 |
| 7,921,365 B2 * | 4/2011 | Sauve | ............... | G03F 3/0483 |
| | | | | 715/777 |
| 7,921,372 B2 * | 4/2011 | Sauve | ............... | G03F 9/4443 |
| | | | | 715/767 |
| 8,181,119 B1 | 5/2012 | Ording et al. | | |
| 8,631,340 B2 * | 1/2014 | Schreiner | ............ | G06F 3/0483 |
| | | | | 439/152 |
| 8,631,341 B2 * | 1/2014 | Sauve | ............... | G06F 3/0481 |
| | | | | 715/776 |
| 8,910,070 B2 * | 12/2014 | Goodger | ............ | G06F 17/30905 |
| | | | | 715/764 |
| 9,003,277 B2 | 4/2015 | Wan | | |
| 9,003,321 B2 * | 4/2015 | Pagan | ............... | G06F 9/4443 |
| | | | | 715/777 |
| 9,032,309 B2 * | 5/2015 | Ainslie | ............ | G06F 17/30873 |
| | | | | 715/760 |
| 9,213,775 B2 * | 12/2015 | Tseng | ............ | G06F 17/30884 |
| 9,232,011 B2 * | 1/2016 | Galushka | ............ | G06F 17/3089 |
| 9,280,608 B2 * | 3/2016 | Jang | ............... | G06F 17/30884 |
| 2004/0093562 A1 * | 5/2004 | Diorio | ............ | G06F 17/30873 |
| | | | | 715/205 |
| 2004/0113948 A1 * | 6/2004 | Shahrbabaki | ......... | G06F 3/0483 |
| | | | | 715/777 |
| 2005/0015726 A1 * | 1/2005 | Tuominen | ......... | G06F 17/30905 |
| | | | | 715/733 |
| 2006/0218500 A1 * | 9/2006 | Sauve | ............... | G06F 9/4443 |
| | | | | 715/777 |
| 2006/0230356 A1 * | 10/2006 | Sauve | ............... | G06F 3/0483 |
| | | | | 715/777 |
| 2007/0067733 A1 * | 3/2007 | Moore | ............ | G06F 17/30899 |
| | | | | 715/777 |
| 2008/0301562 A1 * | 12/2008 | Berger | ............ | G06F 17/3089 |
| | | | | 715/733 |
| 2008/0313144 A1 * | 12/2008 | Huston | ............ | G06F 17/30864 |
| 2009/0006981 A1 | 1/2009 | Pagan | | |
| 2009/0327947 A1 * | 12/2009 | Schreiner | ............ | G06F 3/0483 |
| | | | | 715/777 |
| 2010/0011313 A1 * | 1/2010 | Sauve | ............... | G06F 3/0481 |
| | | | | 715/777 |
| 2010/0070928 A1 * | 3/2010 | Goodger | ............ | G06F 17/30905 |
| | | | | 715/838 |
| 2011/0202828 A1 | 8/2011 | Wan | | |
| 2011/0239138 A1 * | 9/2011 | Galushka | ............ | G06F 17/3089 |
| | | | | 715/760 |
| 2011/0314407 A1 | 12/2011 | Cruz Moreno et al. | | |
| 2012/0109741 A1 | 5/2012 | Ballapragada et al. | | |
| 2012/0221564 A1 | 8/2012 | Jones et al. | | |
| 2012/0331408 A1 * | 12/2012 | Ainslie | ............ | G06F 17/30873 |
| | | | | 715/760 |
| 2013/0061160 A1 * | 3/2013 | Tseng | ............ | G06F 17/30905 |
| | | | | 715/760 |
| 2013/0311869 A1 | 11/2013 | Jang | | |

\* cited by examiner

BROWSER APPLICATION AND A METHOD OF OPERATING THE BROWSER APPLICATION

CROSS-REFERENCE

The present application claims priority to Russian Patent Application No. 2014117577, filed Apr. 30, 2014, entitled "A BROWSER APPLICATION AND A METHOD OF OPERATING THE BROWSER APPLICATION" and is a continuation of PCT/IB2014/065791 filed on Nov. 4, 2014, entitled "A BROWSER APPLICATION AND A METHOD OF OPERATING THE BROWSER APPLICATION", the entirety of both of which are incorporated herein.

FIELD

The present technology relates to web browsers in general and specifically to a browser application and a method for managing same.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to gain access to rich content (like images, audio, video, animation, and other multimedia content from such networks).

In order to access a web resource, u user typically utilizes a browser application. With reference to FIG. 1, a screen shot 102 depicts a browser application 104 generally implemented according to the known state of the art. The browser application 104 can be executed on most known electronic devices (laptops, desktops, smartphones, pads and the like). The depicted screen shot 102 illustrated the browser application 104, which browser application 104 is implemented as a Mozilla Firefox browser. However, those in the art will appreciate numerous other known types of browser applications 104, such as a Google™ Chrome™, a Yandex™ browser, as well as a number of additional commercial or proprietary browsers.

Irrespective of how the browser application 104 is implemented, the browser application 104, typically, has a command interface 106 and a browsing interface 108. Generally speaking, a given user can access a resource on the communication network by two principle means. The given user can access a particular resource directly, either by typing an address of the resource (typically an URL or Universal Resource Locator, such as www.webpage.com) into the command interface 106 or by clicking a link in an e-mail or in another web resource (which action will in a sense "copy and paste" the URL associated with the link into the command interface 106).

Alternatively, the given user may conduct a search using a search engine to locate a resource of interest. The latter is particularly suitable in those circumstances, where the given user knows a topic of interest, but does not know the exact address of the resource she is interested in. The search engine typically returns a Search Engine Results Page (SERP) containing links to one or more web resources that are responsive to the user query. Again, upon user clicking one or more links provided within the SERP, the user can open the required web resource.

Hence, the purpose of the command interface 106 is to allow the user to type or copy-and-paste a Unified Resource Locator (URL) or, simply, an address associated with the web resource the user is looking for. The purpose of the browsing interface 108 is to show the web resource that is hosted at the address, which URL is entered into the command interface 106.

Within the modern browser applications 104, the command interface 106 is typically implemented as an "omnibox" field—the one incorporating functionality of the field for entering URLs and the field for entering search queries for the search engine associated with the browser application 104 to search. In other words, within such prior art implementations, the user can use the command interface 106 for both entering search queries and URLs. The browsing interface 108 is, therefore, can be for displaying to the user either (i) a web resource associated with the URL entered into the command interface 106 or (ii) a search results page (SERP) generated in response to the search query entered in the command interface 106.

Now, as a brief description of the browser application 104, the browser application 104 includes a browser command buttons panel 112, the browser command buttons panel 112 including a number of conventionally known fields, such as "File", "Edit", "View", "History", "Bookmarks", "Tools", "Help". The browser application 104 includes a browser control buttons panel 111, which browser control buttons panel 111 includes the well-known button for minimizing the browser screen, maximizing the browser screen and closing the browser screen (all not numbered).

The browser application 104 also includes a conventionally-known back button 116, the back button 116 for allowing the user to go back to one or more of the previously viewed web resources. The browser application 104 also includes a forward button 118 (greyed out) for going "forward" after the back button 116 has been potentially used. The browser application 104 contains a number of additional buttons 120, such as a reload button, a close button and a "home" button (all not numbered) conventionally known to those of skill in the art.

There is also provided an area 122 for one or more tabs of the browsed pages. It is typical for the user to multi-task when browsing the various web resources using the browser application 104. For example, a given user may have multiple web resources "opened" at the same time. To address this situation, the user may open several instances of the browser application 104, each instance showing therein a different web resource (so-called, browsing by window). Alternatively, the user may open several "tabs" in a single instance of the browser application 104, each tab showing therein a different web resource (so-called, browsing by tabs). The graphical indication of each opened tab will appear in the area 122. The user can then switch between the various opened web resources by either selecting an appropriate window (i.e. instance of the browser application 104) or by selecting an appropriate tab within the single instance of the browser application 104. Needless to say, the two methods can be mixed and matched by the given user in a single browsing session.

With reference to FIG. 2, there is depicted a screen shot 200, the screen shot 200 depicting the browser application 104 with fifteen instances of tabs 202 opened therein. The fifteen instances of tabs 202 are representative of the fifteen web resources currently being browsed by the user. Within the depicted illustration, fourteen out of the fifteen web resources currently being browsed are the various articles on the Wikipedia web resource, each of the articles being associated with a dedicated one of the fifteen instances of tabs 202. Naturally, rather having fifteen instances of tabs 202, the user could have opened fifteen instance of the browser application 104.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions. One of the shortcomings of the prior art approaches to implementing the browser application having multiple tabs is that the control area (such as the browser command buttons panel 112, the area 122 and the like) of such prior art browser applications takes over a significant proportion of the screen real estate that would otherwise be dedicated to the above-described browsing interface 108. Whereas with larger screen, this problem may not be as acute, with smaller screens (especially those on smartphones and pads), this can be deemed as an inconvenience by some of the users.

As such, according to a first broad aspect of the present technology, there is provided a method of displaying a web resource to a user in a browser application executed on an electronic device. The method is executable at the electronic device. The method comprises receiving a request from the user for the web resource; responsive to the request, displaying the web resource substantially in an entirety of a browsing window of the browser application; displaying, within a portion of the entirety of the browsing window a browser element tab having at least one browser element associated with the web resource, the browser element tab for controlling displaying of the web resource within the browsing window, the browser element tab floating within the content of the web resource being displayed within the browsing window.

In some implementations of the method, the web resource being a first web resource, the method further comprising: receiving a second request from the user for a second web resource; responsive to the second request, displaying the second web resource substantially in the entirety of the browsing window of the browser application; augmenting the browser element tab with a second browser element associated with the second web resource.

In some implementations of the method, the method further comprises augmenting the second browser element with an active indicator.

In some implementations of the method, responsive to the user actuating the first browser element associated with the web resource, the method further comprises displaying the web resource and augmenting the first browser element with an active indicator.

In some implementations of the method, the method further comprises receiving a third request from the user for a third web resource; responsive to the third request, displaying the third web resource substantially in the entirety of the browsing window of the browser application; augmenting the browser element tab with a third browser element associated with the third web resource.

In some implementations of the method, responsive to any two of the first web resource, the second web resource and the third web resource belonging to a single domain, the method further comprises replacing the respective two of the first browser element, the second browser element and the third browser element with a unified browser element representative of the respective two of the first browser element, the second browser element and the third browser element.

In some implementations of the method, responsive to the user actuating the unified browser element, the method further comprises splitting the unified browser element back into the respective two of the first browser element, the second browser element and the third browser element.

In some implementations of the method, responsive to the user selecting one of the first browser element and the second browser element, the method further comprises displaying to the user the respective first web resource and the second web resource.

In some implementations of the method, the method further comprises augmenting the selected one of the first browser element and the second browser element with an indication of the active indicator.

In some implementations of the method, the method further comprises determining that any two of the first web resource, the second web resource and the third web resource belong to the single domain by analyzing at least a portion of respective web addresses.

In some implementations of the method, responsive to the user scrolling the content of the web resource, the method further comprises scrolling the content of the web resource around the browser element tab.

In some implementations of the method, the method further comprises amending the web resource with user non-relevant information at a bottom portion of the web resource.

In some implementations of the method, a height of the bottom portion is at least the same as a height of the browser element tab.

In another broad aspect of the present technology there is provided an electronic device. The electronic device comprises a user input interface for receiving user inputs; a user output interface for providing at least one of visual and audible outputs to the user; a network communication interface for two-way communication over a communication network; and a processor coupled to the user input interface, the user output interface and the network communication interface, the processor being configured to have access to computer readable commands which commands, when executed, cause the processor to execute a browser application for displaying a web resource to the user via the user output interface, the commands being further operable to cause the processor to: receive, via the user input interface, a request from the user for the web resource; responsive to the request, display via the user output interface, the web resource substantially in an entirety of a browsing window of the browser application; display, via the user output interface, within a portion of the entirety of the browsing window a browser element tab having at least one browser element associated with the web resource, the browser element tab for controlling displaying of the web resource within the browsing window, the browser element tab floating within the content of the web resource being displayed within the browsing window.

In some implementations of the electronic device, the web resource being a first web resource, commands being further operable to cause the processor to: receive, via the user input interface, a second request from the user for a second web resource; responsive to the second request, display via the user output interface the second web resource substantially in the entirety of the browsing window of the browser application; augmenting the browser element tab with a second browser element associated with the second web resource.

In some implementations of the electronic device, commands are further operable to cause the processor to augment the second browser element with an active indicator.

In some implementations of the electronic device, commands are further operable to cause the processor, responsive to the user actuating the first browser element associated with the web resource, to display the web resource and to augment the first browser element with an active indicator.

In some implementations of the electronic device, the commands are further operable to cause the processor to: receive, via the user input interface, a third request from the user for a third web resource; responsive to the third request, to display, via the user output interface, the third web resource substantially in the entirety of the browsing window of the browser application; augment the browser element tab with a third browser element associated with the third web resource.

In some implementations of the electronic device, the commands are further operable to cause the processor, responsive to any two of the first web resource, the second web resource and the third web resource belonging to a single domain, to replace the respective two of the first browser element, the second browser element and the third browser element with a unified browser element representative of the respective two of the first browser element, the second browser element and the third browser element.

In some implementations of the electronic device, the commands are further operable to cause the processor, responsive to the user actuating the unified browser element, to split the unified browser element back into the respective two of the first browser element, the second browser element and the third browser element.

In some implementations of the electronic device, the commands are further operable to cause the processor, responsive to the user selecting one of the first browser element and the second browser element, to display to the user the respective first web resource and the second web resource.

In some implementations of the electronic device, the commands are further operable to cause the processor to augment the selected one of the first browser element and the second browser element with an indication of the active indicator.

In some implementations of the electronic device, the commands are further operable to cause the processor to determine that any two of the first web resource, the second web resource and the third web resource belong to the single domain by analyzing at least a portion of respective web addresses.

In some implementations of the electronic device, the commands are further operable to cause the processor, responsive to the user scrolling the content of the web resource, to scroll the content of the web resource around the browser element tab.

In some implementations of the electronic device, the commands are further operable to cause the processor to amend the web resource with user non-relevant information at a bottom portion of the web resource.

In some implementations of the electronic device, a height of the bottom portion is at least the same as a height of the browser element tab.

According to another broad aspect of the present technology, there is also provided a non-transient computer readable medium comprising computer executable instructions, which instructions when executed on an electronic device, cause the electronic device to execute a browser application. The browser application is configured to receive, via the user input interface, a request from the user for the web resource; responsive to the request, display via the user output interface, the web resource substantially in an entirety of a browsing window of the browser application; display, via the user output interface, within a portion of the entirety of the browsing window a browser element tab having at least one browser element associated with the web resource, the browser element tab for controlling displaying of the web resource within the browsing window, the browser element tab floating within the content of the web resource being displayed within the browsing window.

In some implementations of the non-transient computer readable medium, the web resource being a first web resource, commands are further operable to cause the browser application to: receive, via the user input interface, a second request from the user for a second web resource; responsive to the second request, display via the user output interface the second web resource substantially in the entirety of the browsing window of the browser application; augmenting the browser element tab with a second browser element associated with the second web resource.

In some implementations of the non-transient computer readable medium, commands are further operable to cause the browser application to augment the second browser element with an active indicator.

In some implementations of the non-transient computer readable medium, commands are further operable to cause the browser application, responsive to the user actuating the first browser element associated with the web resource, to display the web resource and to augment the first browser element with an active indicator.

In some implementations of the non-transient computer readable medium, commands are further operable to cause the browser application to: receive, via the user input interface, a third request from the user for a third web resource; responsive to the third request, to display, via the user output interface, the third web resource substantially in the entirety of the browsing window of the browser application; augment the browser element tab with a third browser element associated with the third web resource.

In some implementations of the non-transient computer readable medium, commands are further operable to cause the browser application, responsive to any two of the first web resource, the second web resource and the third web resource belonging to a single domain, to replace the respective two of the first browser element, the second browser element and the third browser element with a unified browser element representative of the respective two of the first browser element, the second browser element and the third browser element.

In some implementations of the non-transient computer readable medium, commands are further operable to cause the browser application, responsive to the user actuating the unified browser element, to split the unified browser element back into the respective two of the first browser element, the second browser element and the third browser element.

In some implementations of the non-transient computer readable medium, commands are further operable to cause the browser application, responsive to the user selecting one of the first browser element and the second browser element, to display to the user the respective first web resource and the second web resource.

In some implementations of the non-transitory computer readable medium, commands are further operable to cause the browser application to augment the selected one of the first browser element and the second browser element with an indication of the active indicator.

In some implementations of the non-transitory computer readable medium, commands are further operable to cause the browser application to determine that any two of the first web resource, the second web resource and the third web resource belong to the single domain by analyzing at least a portion of respective web addresses.

In some implementations of the non-transitory computer readable medium, commands are further operable to cause the browser application, responsive to the user scrolling the content of the web resource, to scroll the content of the web resource around the browser element tab.

In some implementations of the non-transitory computer readable medium, commands are further operable to cause the browser application to amend the web resource with user non-relevant information at a bottom portion of the web resource.

In some implementations of the non-transitory computer readable medium, a height of the bottom portion is at least the same as a height of the browser element tab.

According to another broad aspect of the present technology, there is provided a method of displaying a web resource to a user in a browser application executed on an electronic device. The method is executable at the electronic device. The method comprises: receiving a request from the user for the web resource; responsive to the request, displaying the web resource substantially in an entirety of a browsing window of the browser application; receiving a second request from the user for a second web resource; responsive to the second request, displaying the second web resource substantially in an entirety of a browsing window of the browser application instead of displaying the web resource; displaying, within a portion of the entirety of the browsing window a browser element tab, the browser element tab for controlling displaying of the first web resource and the second web resource within the browsing window, the browser element tab having: responsive to the first web resource and the second web resource belonging to different domains: a first browser element representative of the first web resource and a second browser element representative of the second web resource; responsive to the first web resource and the second web resource belonging to a single domain: a unified browser element representative of the single domain, the unified browser element being selectively: collapsible into the unified browser element for representing both the first web resource and the second web resource; expandable to include a first browser sub-element representative of the first web resource and a second browser sub-element representative of the second web resource.

In some implementations of the method, the method further comprises augmenting one of the unified browser element and the second browser sub-element with an active indicator.

In some implementations of the method, the first web resource and the second web resource belonging to the single domain, the method further comprises: responsive to the user expanding unified browser element, displaying the first browser sub-element and the second browser sub-element.

In some implementations of the method, the displaying the first browser sub-element and the second browser sub-element is executed by use of animation for a gradual appearance of the first browser sub-element and the second browser sub-element.

In some implementations of the method, the unified browser element is collapsible and expandable through animation for respective one of a gradual appearance of the first browser sub-element and the second browser sub-element and a gradual disappearance of the first browser sub-element and the second browser sub-element.

In some implementations of the method, responsive to the user selecting one of the first browser sub-element and the second browser sub-element, the method further comprises displaying to the user the respective first web resource and the second web resource.

In some implementations of the method, the method further comprises augmenting the selected one of the first browser sub-element and the second browser sub-element with an indication of an active indicator.

In some implementations of the method, the browser element tab floats within the content of the web resource being displayed within the browsing window.

In some implementations of the method, responsive to the user scrolling the content of one of the first web resource and the second web resource, the method further comprises scrolling content of the one of the first web resource and the second web resource around the browser element tab.

In some implementations of the method, the method further comprises amending one of the first web resource and the second web resource with user non-relevant information at a bottom portion of the one of the first web resource and the second web resource.

In some implementations of the method, a height of the bottom portion is at least the same as a height of the browser element tab.

According to another broad aspect of the present technology, there is provided an electronic device. The electronic device comprises: a user input interface for receiving user inputs; a user output interface for providing at least one of visual and audible outputs to the user; a network communication interface for two-way communication over a communication network; and a processor coupled to the user input interface, the user output interface and the network communication interface, the processor being configured to have access to computer readable commands which commands, when executed, cause the processor to execute a browser application for displaying a web resource to the user via the user output interface, the commands being further operable to cause the processor to: receive a request from the user for the web resource; responsive to the request, display the web resource substantially in an entirety of a browsing window of the browser application; receive a second request from the user for a second web resource; responsive to the second request, display the second web resource substantially in an entirety of a browsing window of the browser application instead of displaying the web resource; display, within a portion of the entirety of the browsing window a browser element tab, the browser element tab for controlling displaying of the first web resource and the second web resource within the browsing window, the browser element tab having: responsive to the first web resource and the second web resource belonging to different domains: a first browser element representative of the first web resource and a second browser element representative of the second web resource; responsive to the first web resource and the second web resource belonging to a single domain: a unified browser element representative of the single domain, the unified browser element being selectively: collapsible into the unified browser element for representing both the first web resource and the second web resource; expandable to include a first browser sub-element representative of the first web resource and a second browser sub-element representative of the second web resource.

In some implementations of the electronic device, the commands are further operable to cause the processor to augment one of the unified browser element and the second browser sub-element with an active indicator.

In some implementations of the electronic device, the first web resource and the second web resource belonging to the single domain, the commands are further operable to cause the processor, responsive to the user expanding unified browser element, to display the first browser sub-element and the second browser sub-element.

In some implementations of the electronic device, to display the first browser sub-element and the second browser sub-element, the commands are further operable to cause the processor to execute displaying the first browser sub-element and the second browser sub-element by use of animation for a gradual appearance of the first browser sub-element and the second browser sub-element.

In some implementations of the electronic device, the unified browser element is collapsible and expandable through animation for respective one of a gradual appearance of the first browser sub-element and the second browser sub-element and a gradual disappearance of the first browser sub-element and the second browser sub-element.

In some implementations of the electronic device, the commands are further operable to cause the processor, responsive to the user selecting one of the first browser sub-element and the second browser sub-element, to display to the user the respective first web resource and the second web resource.

In some implementations of the electronic device, the commands are further operable to cause the processor to augment the selected one of the first browser sub-element and the second browser sub-element with an indication of an active indicator.

In some implementations of the electronic device, the browser element tab floats within the content of the web resource being displayed within the browsing window.

In some implementations of the electronic device, the commands are further operable to cause the processor, responsive to the user scrolling the content of one of the first web resource and the second web resource, to scroll content of the one of the first web resource and the second web resource around the browser element tab.

In some implementations of the electronic device, the commands are further operable to cause the processor to amend one of the first web resource and the second web resource with user non-relevant information at a bottom portion of the one of the first web resource and the second web resource.

In some implementations of the electronic device, a height of the bottom portion is at least the same as a height of the browser element tab.

According to another broad aspect of the present technology, there is provided a non-transient computer readable medium comprising computer executable instructions, which instructions when executed on an electronic device, cause the electronic device to execute a browser application. The browser application is configured to: receive a request from the user for the web resource; responsive to the request, display the web resource substantially in an entirety of a browsing window of the browser application; receive a second request from the user for a second web resource; responsive to the second request, display the second web resource substantially in an entirety of a browsing window of the browser application instead of displaying the web resource; display, within a portion of the entirety of the browsing window a browser element tab, the browser element tab for controlling displaying of the first web resource and the second web resource within the browsing window, the browser element tab having: responsive to the first web resource and the second web resource belonging to different domains: a first browser element representative of the first web resource and a second browser element representative of the second web resource; responsive to the first web resource and the second web resource belonging to a single domain: a unified browser element representative of the single domain, the unified browser element being selectively: collapsible into the unified browser element for representing both the first web resource and the second web resource; expandable to include a first browser sub-element representative of the first web resource and a second browser sub-element representative of the second web resource.

In some implementations of the non-transient computer readable medium, the commands are further operable to cause the browser application to augment one of the unified browser element and the second browser sub-element with an active indicator.

In some implementations of the non-transient computer readable medium, the first web resource and the second web resource belonging to the single domain, the commands are further operable to cause the browser application, responsive to the user expanding unified browser element, to display the first browser sub-element and the second browser sub-element.

In some implementations of the non-transient computer readable medium, to display the first browser sub-element and the second browser sub-element, the commands are further operable to cause the browser application to execute displaying the first browser sub-element and the second browser sub-element by use of animation for a gradual appearance of the first browser sub-element and the second browser sub-element.

In some implementations of the non-transient computer readable medium, the unified browser element is collapsible and expandable through animation for respective one of a gradual appearance of the first browser sub-element and the second browser sub-element and a gradual disappearance of the first browser sub-element and the second browser sub-element.

In some implementations of the non-transient computer readable medium, the commands are further operable to cause the browser application, responsive to the user selecting one of the first browser sub-element and the second browser sub-element, to display to the user the respective first web resource and the second web resource.

In some implementations of the non-transient computer readable medium, the commands are further operable to cause the browser application to augment the selected one of the first browser sub-element and the second browser sub-element with an indication of an active indicator.

In some implementations of the non-transient computer readable medium, the browser element tab floats within the content of the web resource being displayed within the browsing window.

In some implementations of the non-transient computer readable medium, the commands are further operable to cause the browser application, responsive to the user scrolling the content of one of the first web resource and the second web resource, to scroll content of the one of the first web resource and the second web resource around the browser element tab.

In some implementations of the non-transient computer readable medium, the commands are further operable to cause the browser application to amend one of the first web resource and the second web resource with user non-relevant information at a bottom portion of the one of the first web resource and the second web resource.

In some implementations of the non-transient computer readable medium, a height of the bottom portion is at least the same as a height of the browser element tab.

According to yet another broad aspect of the present technology, there is provided a method of providing a browser application to a user of an electronic device. The method is executable at the electronic device. The method comprises displaying, on a screen of the electronic device a browser window, the browser window having: a command interface and a browsing interface; the command interface including a browser command buttons panel for enabling the user to control at least one of the browser application and content being displayed in the browsing interface; the command interface further including an omnibox located inside the command interface.

In some implementations of the method, the omnibox is located in-line with the browser command buttons panel within the command interface.

In some implementations of the method, the step of displaying comprises displaying at least a portion of the command interface in a semi-transparent manner.

In some implementations of the method, the method further comprises displaying the entirety of the command interface in the semi-transparent manner.

In some implementations of the method, the method further comprises receiving, via the omnibox, a request from the user for the web resource; responsive to the request, displaying the web resource substantially in an entirety of the browsing interface.

In some implementations of the method, responsive to a scroll request from the user, the method further comprises scrolling content of the web resource, a portion of the content located behind the respective semi-transparent portion of the command interface being at least partially visible to the user.

In some implementations of the method, the command interface further comprising a secondary control buttons.

In some implementations of the method, the command interface further comprising an application icons area.

In some implementations of the method, the browser command buttons panel, the secondary control buttons, the omnibox and the application icons area constitute an entirety of command buttons provided by the browser application for enabling the user to control at least one of the browser application and content being displayed in the browsing interface.

In some implementations of the method, the remainder of the browser window is dedicated to content provided by a web resource requested by the user.

In some implementations of the method, the browser command buttons panel including a back button.

In some implementations of the method, the back button includes an indication of a web resource previously visited to which the back button points.

According to another broad aspect of the present technology, there is provided non-transient computer readable medium comprising computer executable instructions, which instructions when executed on an electronic device, cause the electronic device to execute a browser application. The browser application is configured to: display, on a screen of the electronic device a browser window, the browser window having: a command interface and a browsing interface; the command interface including a browser command buttons panel for enabling the user to control at least one of the browser application and content being displayed in the browsing interface; the command interface further including an omnibox located inside the command interface.

In some implementations of the non-transient computer readable medium, the omnibox is located in-line with the browser command buttons panel within the command interface.

In some implementations of the non-transient computer readable medium, the browser application is further configured to display at least a portion of the command interface in a semi-transparent manner.

In some implementations of the non-transient computer readable medium, the browser application is further configured to display the entirety of the command interface in the semi-transparent manner.

In some implementations of the non-transient computer readable medium, the browser application is further configured to: receive, via the omnibox, a request from the user for the web resource; responsive to the request, display the web resource substantially in an entirety of the browsing interface.

In some implementations of the non-transient computer readable medium, responsive to a scroll request from the user, the browser application is further configured to scroll content of the web resource, a portion of the content located behind the respective semi-transparent portion of the command interface being at least partially visible to the user.

In some implementations of the non-transient computer readable medium, the command interface further comprising a secondary control buttons.

In some implementations of the non-transient computer readable medium, the command interface further comprising an application icons area.

In some implementations of the non-transient computer readable medium, the browser command buttons panel, the secondary control buttons, the omnibox and the application icons area constitute an entirety of command buttons provided by the browser application for enabling the user to control at least one of the browser application and content being displayed in the browsing interface.

In some implementations of the non-transient computer readable medium, the remainder of the browser window is dedicated to content provided by a web resource requested by the user.

In some implementations of the non-transient computer readable medium, the browser command buttons panel including a back button.

In some implementations of the non-transient computer readable medium, the back button includes an indication of a web resource previously visited to which the back button points.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

Figure 2:
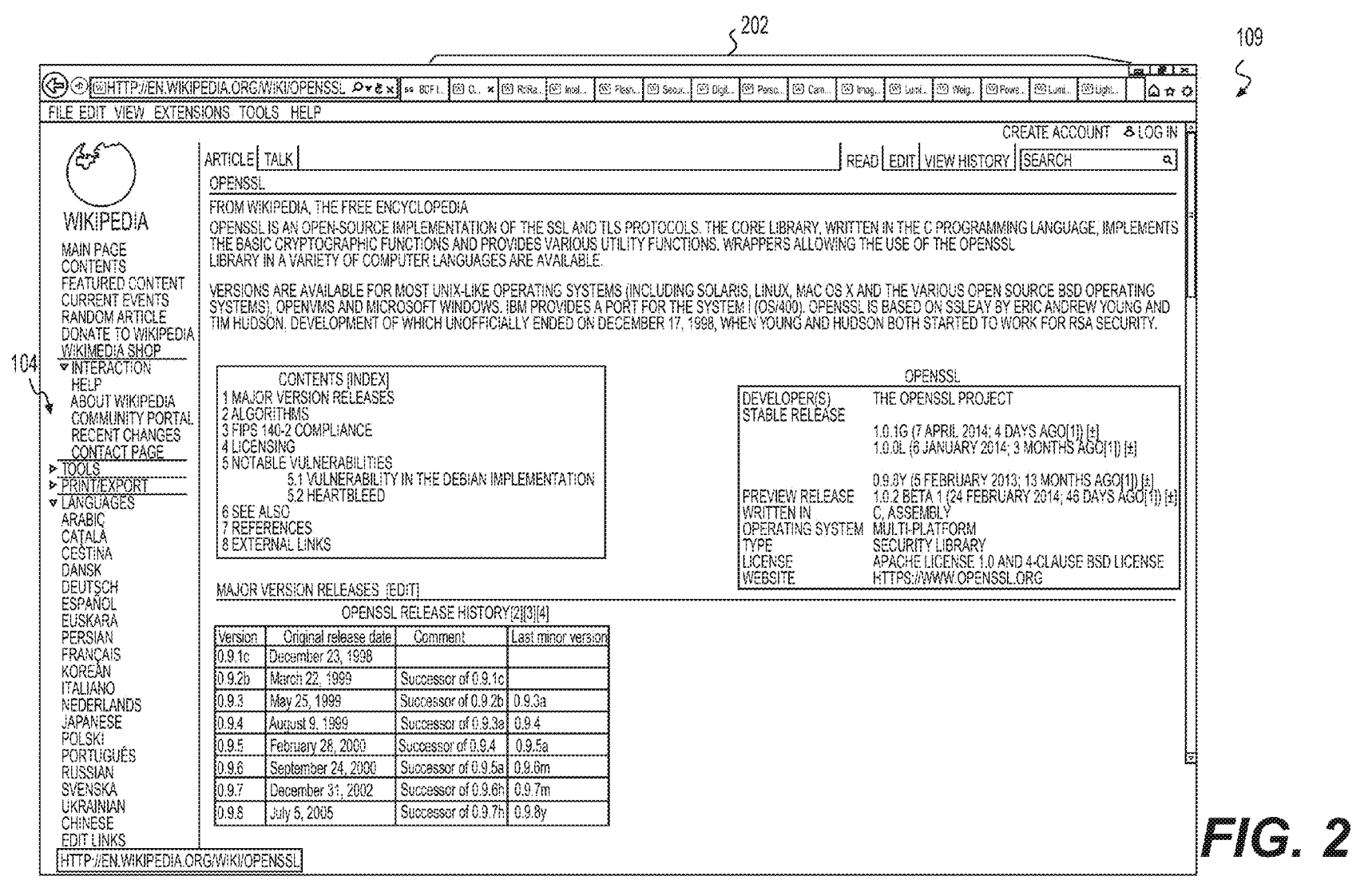

FIG. 2 depicts a screen shot 200 showing the browser application 104 of the prior art with fifteen instances of a tab 202 opened therein.

FIG. 4 depicts a screen shot 400, which illustrates one non-limiting embodiment of the browser application 304 implemented according to embodiment of the present technology.

FIG. 5 depicts a screen shot 500, which illustrates one non-limiting embodiment of the browser application 304 implemented according to embodiment of the present technology, the browser application 304 shown in one variant of the present technology.

DETAILED DESCRIPTION

Figure 1:
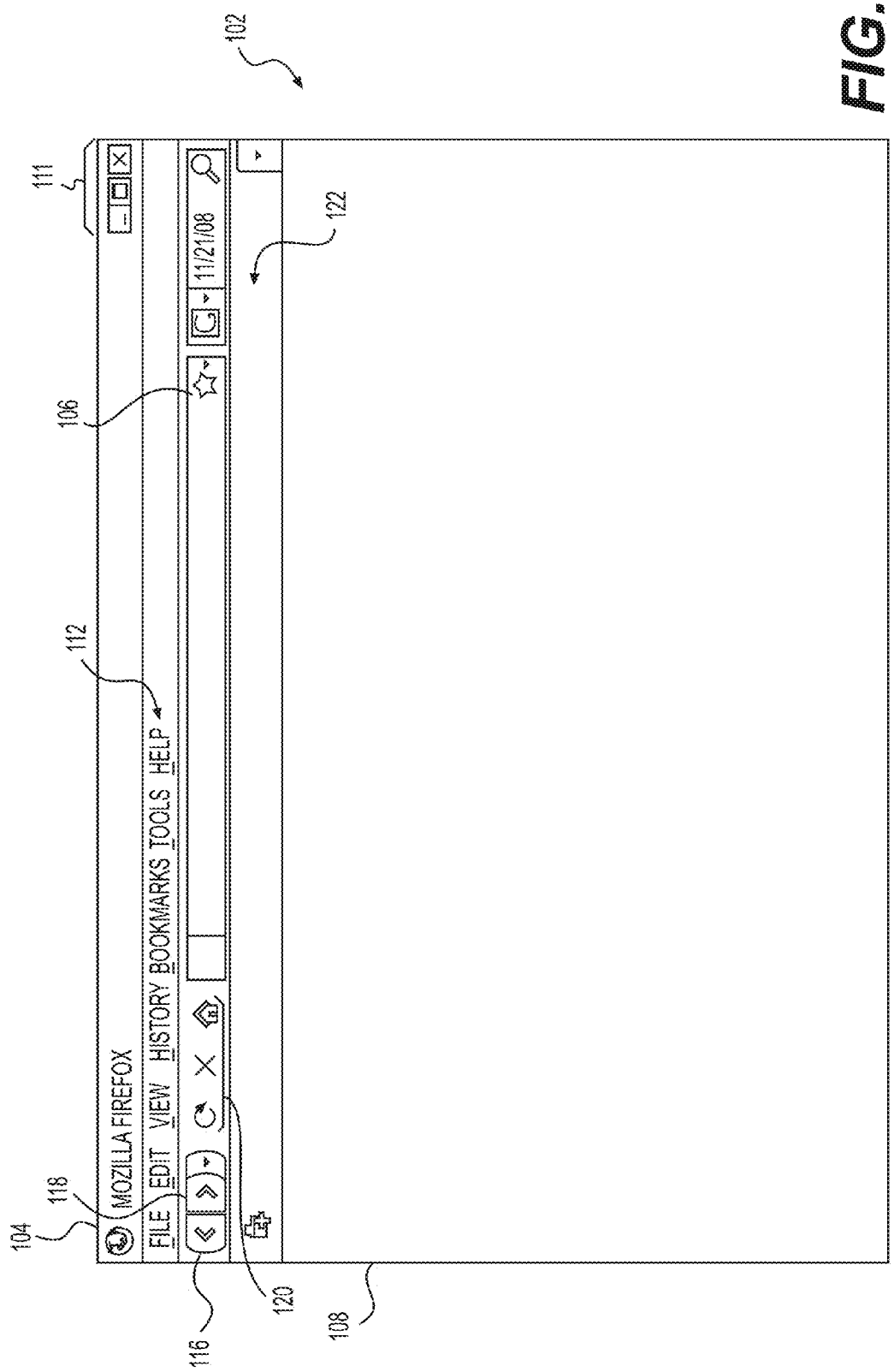
FIG. 1 is a schematic representation of a screen shot 102 showing a browser application 104 generally implemented according to the known state of the art.
Figure 3:
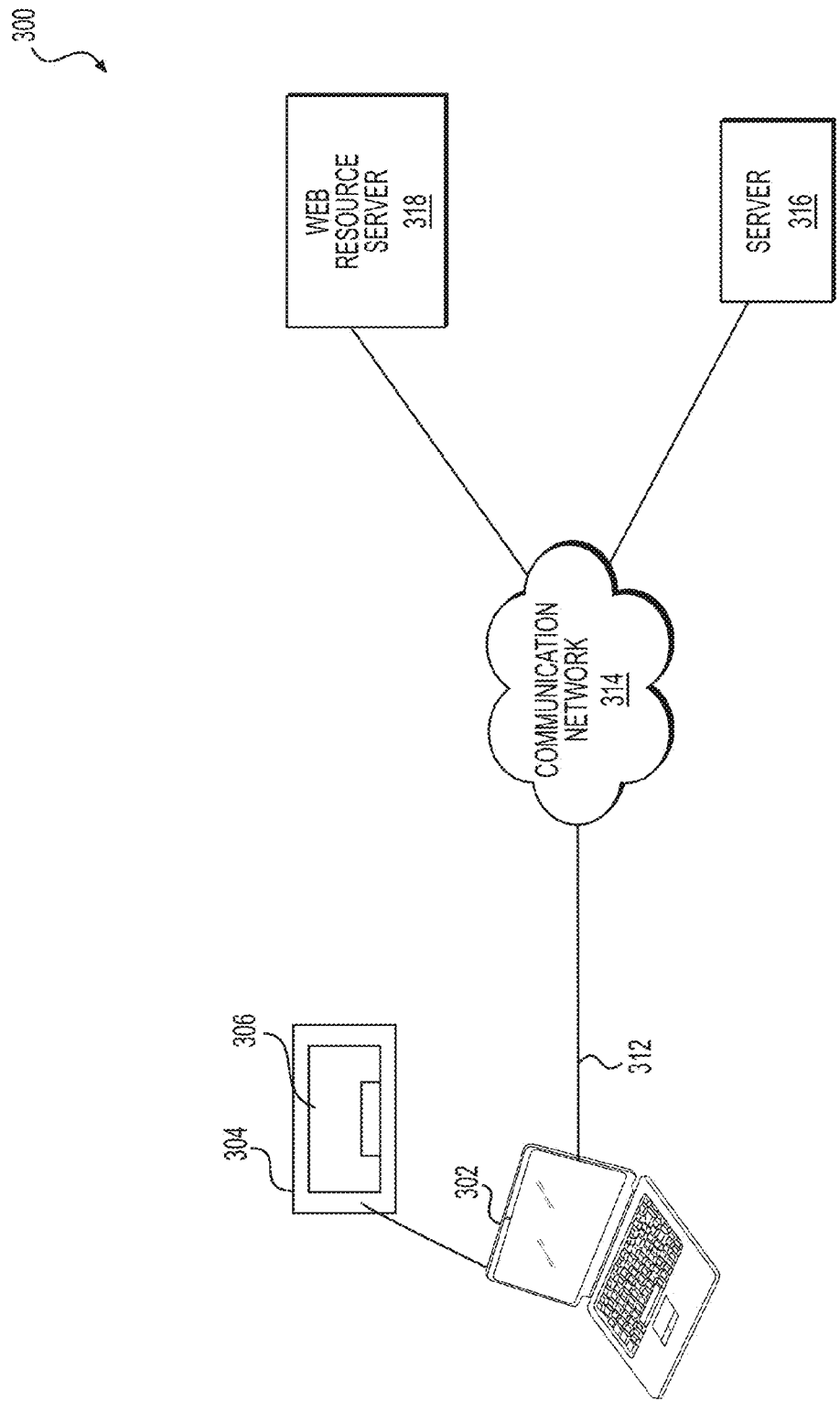
FIG. 3 is a schematic diagram depicting a system 300, the system 300 being implemented in accordance with non-limiting embodiments of the present technology.

Referring to FIG. 3, there is shown a schematic diagram of a system 300, the system 300 being suitable for implementing non-limiting embodiments of the present technology. It is to be expressly understood that the system 300 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 300 may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 300 may provide in certain instances simple implementations of the present technology, and that where such is the case they have been presented in this manner as an aid to understanding. As persons skilled in the art would understand, various implementations of the present technology may be of a greater complexity.

The system 300 comprises an electronic device 302. The electronic device 302 is typically associated with a user (not depicted) and, as such, can sometimes be referred to as a "client device". It should be noted that the fact that the electronic device 302 is associated with the user does not need to suggest or imply any mode of operation—such as a need to log in, a need to be registered or the like.

The implementation of the electronic device 302 is not particularly limited, but as an example, the electronic device 302 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 302 is known in the art and, as such, will not be described here at much length. Suffice it to say that the electronic device 302 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communication network 314; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 302 comprises hardware and/or software and/or firmware (or a combination thereof), as is known in the art, to execute a browser application 304. Generally speaking, the purpose of the browser application 304 is to enable the user (not depicted) to access one or more web resources. The browser application 304 has a user-browsing interface 306. Specific implementations of the user-browser interface 306 will be described in greater detail herein below.

The electronic device 302 is coupled to the above-mentioned communication network 314 via a communication link 312. In some non-limiting embodiments of the present technology, the communication network 314 can be implemented as the Internet. In other embodiments of the present technology, the communication network 314 can be implemented differently, such as any wide-area communication network, local-area communication network, a private communication network and the like.

How the communication link 312 is implemented is not particularly limited and will depend on how the electronic device 302 is implemented. Recalling that the electronic device 302 is implemented, in this example, as a laptop, the communication link 312 can be either wireless (such as the Wireless Fidelity, or WiFi® for short, Bluetooth® or the like) or wired (such as an Ethernet based connection).

It should be expressly understood that implementations for the electronic device 302, the communication link 312 and the communication network 314 are provided for illustration purposes only. As such, those skilled in the art will easily appreciate other specific implementational details for the electronic device 302, the communication link 312 and the communication network 314. As such, by no means, examples provided herein above are meant to limit the scope of the present technology.

Also coupled to the communication network is a server 316. The server 316 can be implemented as a conventional computer server. In an example of an embodiment of the present technology, the server 316 can be implemented as a Dell™ PowerEdge™ Server running the Microsoft™ Windows Server™ operating system. Needless to say, the server 316 can be implemented in any other suitable hardware and/or software and/or firmware or a combination thereof. In the depicted non-limiting embodiment of present technology, the server 316 is a single server. In alternative non-limiting embodiments of the present technology, the functionality of the server 316 may be distributed and may be implemented via multiple servers.

The implementation of the server 316 is well known. However, briefly speaking, the server 316 comprises a communication interface (not depicted) structured and configured to communicate with various entities (such as the electronic device 302, for example and other devices potentially coupled to the communication network 314) via the communication network 314. The server 316 further comprises at least one computer processor (not depicted) operationally connected with the communication interface and structured and configured to execute various processes to be described herein.

In some embodiments, the server 316 can be operated by the same entity that has provided the afore-described browser application 304. In alternative embodiments, the server 316 can be operated by an entity different from the one who has provided the aforementioned browser application 304.

There is also provided a web resource server 318. Akin to the server 316, the web resource server 318 can be implemented as a conventional computer server. In an example of an embodiment of the present technology, the web resource server 318 can be implemented as a Dell™ PowerEdge™ Server running the Microsoft™ Windows Server™ operating system. Needless to say, the web resource server 318 can be implemented in any other suitable hardware and/or software and/or firmware or a combination thereof. In the depicted non-limiting embodiment of present technology, the web resource server 318 is a single server. In alternative non-limiting embodiments of the present technology, the functionality of the web resource server 318 may be distributed and may be implemented via multiple servers.

The web resource server 318 can host one or more web resources that a user associated with the electronic device 304 may be desirous of accessing. In the illustrations to be provided herein below, let it be assumed that the web resource server 318 hosts several web resources: (i) Yandex search browser; (ii) Yandex mail; (iii) Gmail mail; (iv) Russian Wikipedia web resource; (v) a news portal www.lenta.ru. Now, even though all of these web resources (i) to (v) are depicted as hosted on the web resource server 318, in practical terms, they can be hosted on respective ones (i.e. respective one or more) of the web resource servers 318 associated with an entity responsive for the respective one of the web resources (i) to (v). The depiction here has been greatly simplified for illustration purposes only.

Figure 4:
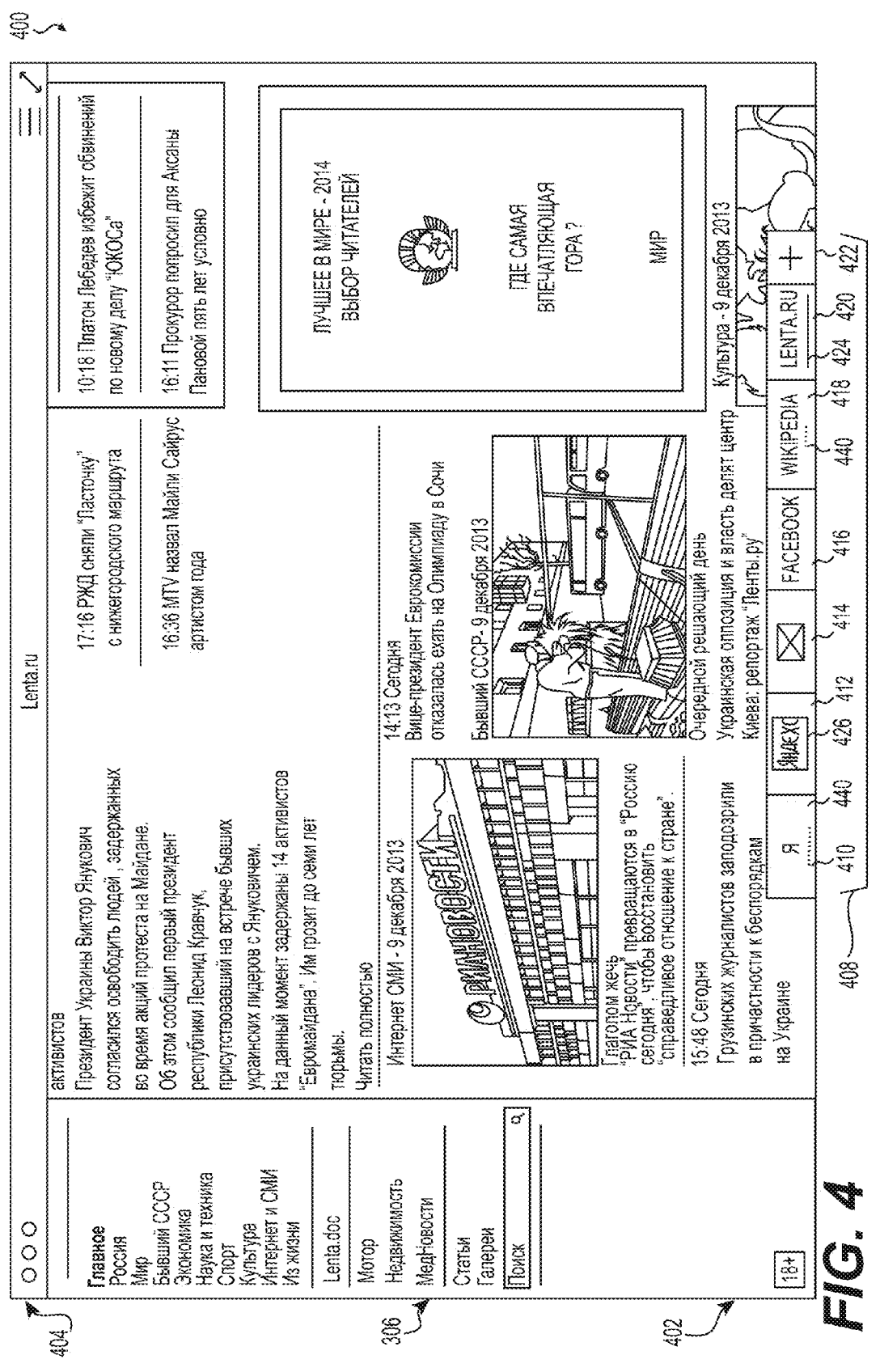

With reference to FIG. 4, there is depicted a screen shot 400, the screen shot 400 illustrating the user-browser interface 306 implemented in accordance with embodiments of the present technology. Within the depicted illustration, the user-browser interface 306 is shown in a state when a web resource has been loaded, in the depicted embodiment the web resource being the news portal www.lenta.ru. To that end, the user-browser interface 306 comprises a browsing window 402, the browsing window 402 for displaying the content of the web resource being browsed. How the user has accessed the web resource is not limited and could be executed as described above: by means of clicking a link, typing in URL and the like.

The user-browser interface 306 also comprises a command bar 404. The command bar 404 is located above the browsing window 402, in the depicted variation. The command bar 404 has several buttons (not separately numbered) for minimizing the user-browser interface 306, for re-sizing the user-browser interface 306, for closing the user-browser interface 306 and the like.

According to various non-limiting embodiments of the present technology, the user-browser interface 306 further comprises a browser elements tab 408. Generally speaking, the browser elements tab 408 contains at least one element for controlling the content being displayed within the user-browser interface 306.

In the depicted embodiment, the browser element tab 408 comprises a first browser element 410, a second browser element 412, a third browser element 414, a fourth browser element 416, a fifth browser element 418 and a sixth browser element 420. It should be noted that the exact number of the elements (i.e. the first browser element 410, the second browser element 412, the third browser element 414, the fourth browser element 416, the fifth browser element 418 and the sixth browser element 420) within the browser element tab 408 is not limited to the ones shown here.

As such, any other number of elements (i.e. the first browser element 410, the second browser element 412, the third browser element 414, the fourth browser element 416, the fifth browser element 418 and the sixth browser element 420) can be present within the browser element tab 408, in accordance to other implementations of the present technology. One should appreciate that the number of the elements (i.e. the first browser element 410, the second browser element 412, the third browser element 414, the fourth browser element 416, the fifth browser element 418 and the sixth browser element 420) depends on the number of web resources that the user has "opened".

There is also provided an add button 422. The add button 422, in the depicted embodiment, includes a sign "+", but this does not need to be so in every embodiment. As such, the add button 422 can comprise any other graphical element, comprise a text "add", "new", "open" or the like. The add button 422 allows to open a new element within the browser element tab 409 (akin to those of the first browser element 410, the second browser element 412, the third browser element 414, the fourth browser element 416, the fifth browser element 418 and the sixth browser element 420). The process for adding a new browser element will be described in greater detail herein below.

In the depicted embodiment, the first browser element 410 is associated with the web resource Yandex search engine and, as such, depicted in FIG. 4 with a logo "SI", in Russian. The second browser element 412 is associated with the web resource Yandex.Mail. The fourth browser element 416 is associated with the web resource Facebook social network web resource. The fifth browser element 418 is associated with the web resource Wikipedia and the sixth browser element 420 is associated with the web resource www.lenta.ru. One will appreciate that the web resources associated with the first browser element 410, the second browser element 412, the third browser element 414, the fourth browser element 416, the fifth browser element 418 and the sixth browser element 420 are the resources that the user has opened, as will be described in greater detail herein below. It should be also noted how the content of the respective web resources gets from the web resource server 118 to the electronic device 302 is known in the art and will not be described here at much length.

It is noted that the sixth browser element 420 (i.e. the one associated with the news portal www.lenta.ru) is presently active—since it is this web resource that is presently being viewed by the user in the browsing window 402. To that extent—the sixth browser element 420 includes an active indicator 424. In the depicted embodiment, the active indicator 424 is implemented as a bar (color coded or not) at the lower portion of the sixth browser element 420. It is noted that the form factor for how the active indicator 424 is not particularly limited. As such, the active indicator 424 can be implemented as a bar at the top portion of the sixth browser element 420, a vertical bar on the left or right edges of the sixth browser element 420. Alternatively, the active indicator 420 can be implemented as a visual element representative of a check mark. Alternatively, the active indicator 420 can be implemented as a visual element depicting the letter "A" for "active" and the like. Naturally, the activity indicator 424 can be implemented as changing the background of the associated browser element, changing the border of the associated browser element, changing the size of the associated browser element, etc.

In those scenarios, where the user would actuate one of the others of the first browser element 410, the second browser element 412, the third browser element 414, the fourth browser element 416 and the fifth browser element 418, the browser application 304: (i) will remove the active indicator 424 from the sixth browser element 420; (ii)

amend the actuated other browser element with the active indicator 424; (iii) display the web resource associated with the actuated other browser element within the user-browser interface 306.

Using the example of the second browser element 212, the second browser element 212 comprises a web resource logo 426. In some embodiment of the present technology, the web resource logo 426 contains a representation associated with the web resource being opened within the second browser element 212. In some embodiments, the web source logo 426 contains an image stored in the so-called favicon file of the web resource associated with the second browser element 212 (the favicon being provided by the web resource server 318 responsible for hosting the associated web resource). As is known, the favicon file is typically separate and is referenced from the HTML file associated with the web resource. Alternatively, the favicon file information may be incorporated into the HTML file associated with the web resource. In yet alternative embodiments of the present technology, the web resource logo 426 can include a text representative of the title of the web resource. In yet further embodiments, the web resource logo 426 can include both a textual and a graphical representation and/or association with the web resource.

In some embodiments, using the example of the fourth browser element 416, the background color of the fourth browser element 416 can be selected by the browser application 304 using an algorithm. In some embodiments, the algorithm includes appreciating the first color defined within the favicon file of the web resource associated with the fourth browser element 416. In other embodiments, the algorithm includes appreciating the most prevalent color within the favicon file of the web resource associated with the fourth browser element 416. In yet further embodiments, the algorithm may include analysis of other information other than that stored within the favicon file of the web resource associated with the fourth browser element 416.

In any case, the browser application 304 can select the background color of the fourth browser element 416, which in this case is selected as a blue color (for example, #8b9dc3 color), as the fourth browser element 416 is associated with the web resource Facebook.

As can be seen in the illustration of FIG. 4, the browser element tab 408 "floats" within the content being browsed in the browsing window 402. Put another way, the content of the browsing window 402 flows around the browser element tab 408. This can be clearly seen to the top (top right corner thereof) and to the right area of the browser element tab 406, where the browser element tab 406 overlays a portion of the content being browsed.

Furthermore, as the content of the browsing window 402 is scrolled up or down using a scroll bar (which scroll bar is not depicted, but is very well known to those of skill in the art), the content (i.e. text, images, links, ads, etc) of the browsing window 402 is scrolled around the browser element tab 406, with a portion of the content being hidden behind the browser element tab 406.

According to embodiments of the present technology, some of the elements of the browser element tab 406 can be implemented as a unified browser element. Generally speaking, the unified browser element is representative of two or more web resources of a single domain, the unified browser element being selectively: (i) collapsible into the unified browser element for representing both the first web resource and the second web resource of the same domain (in case on two web resources, or otherwise being representative an N-number of web resources); expandable to include a first browser sub-element representative of the first web resource of the single domain and a second browser sub-element representative of the second web resource of the single domain (in case on two web resources, or otherwise expandable into an N-number of browser sub-elements).

In some embodiments, it can be determined if the two or more resources belong to a single domain by analyzing at least a portion of respective web addresses (such as URLs and the like). For example, if two resources have the respective URLs: www.domain1.resource1.com and www.domain1.resource2.com—it can be determined that the two resources belong to the same domain (namely, "domain1").

Within the illustration of FIG. 4, two elements of the browser element tab 406 are implemented as the unified browser elements and, hence, are associated with collapsed state indicators 440. Namely, the first browser element 410 and the fifth browser element 418 are associated with a respective collapsed state indicator 440. The collapsed state indicator 440 is indicative of the fact that the respective one of the first browser element 410 and the fifth browser element 416 are in a collapsed state of browsing activity.

Figure 5:
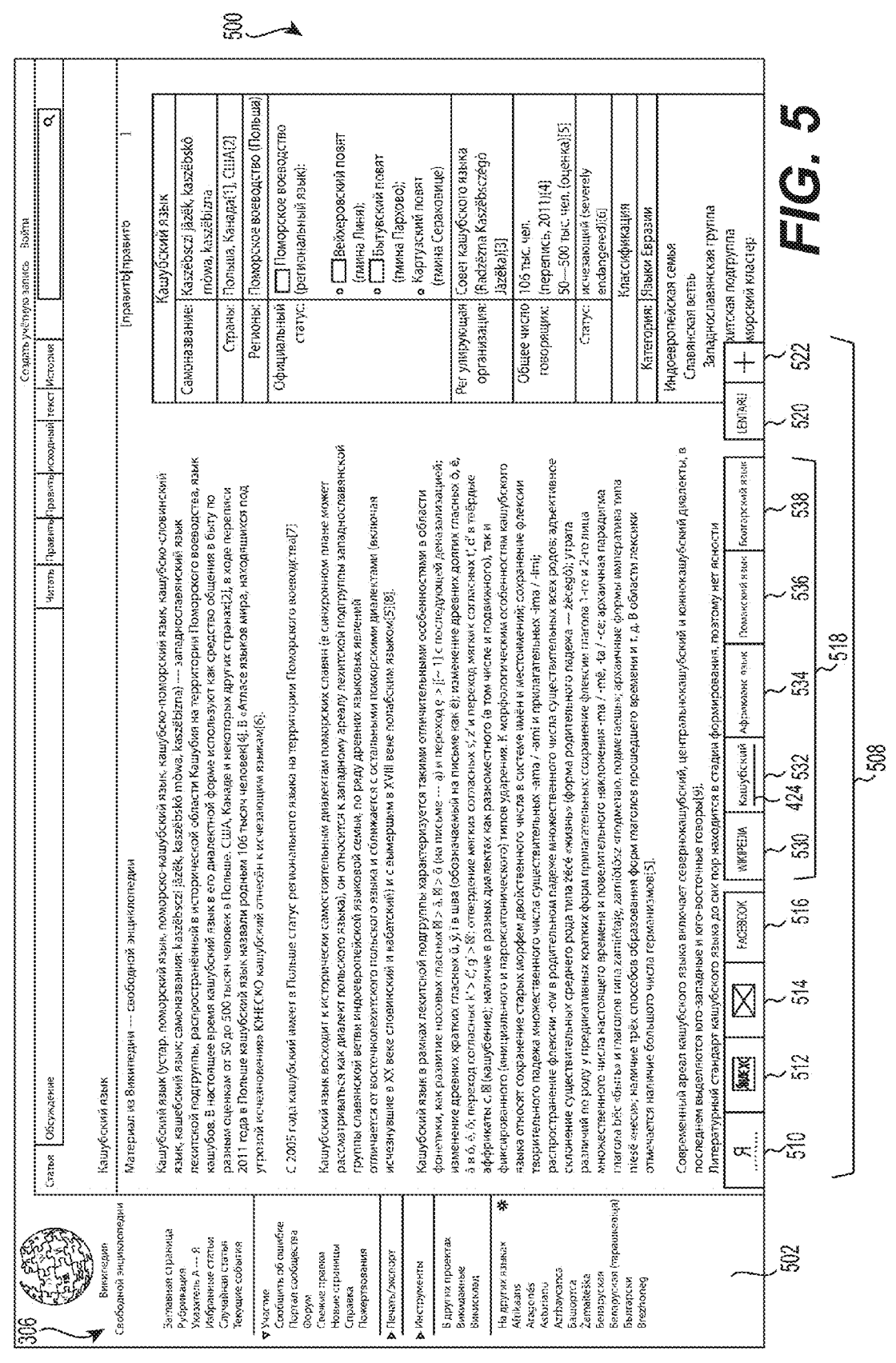

With reference to FIG. 5, there is depicted a screen shot 500, the screen shot 500 illustrating the user-browser interface 306 implemented in accordance with another embodiment of the present technology. Within the depicted illustration, the user-browser interface 306 is shown in a state where a web resource has been loaded, in the depicted embodiment the web resource being the Russian Wikipedia article about Kashub language (in Russian).

To that end, the user-browser interface 306 comprises a browsing window 502, the browsing window 502 for displaying the content of the web resource being browsed (i.e. the Wikipedia article about Kashub language).

The user-browser interface 306 further comprises a browser elements tab 508. In the depicted embodiment, the browser element tab 508 comprises a first browser element 510, a second browser element 512, a third browser element 514, a fourth browser element 516, a fifth browser element 518 and a sixth browser element 520.

There is also provided an add button 522. The add button 522, in the depicted embodiment, includes a sign "+", but this does not need to be so in every embodiment. As such, the add button 522 can comprise any other graphical element, comprise a text "add", "new", "open" or the like. The add button 522 allows to open a new element within the browser element tab 508 (akin to those of the first browser element 510, the second browser element 512, the third browser element 514, the fourth browser element 516, the fifth browser element 518 and the sixth browser element 520). The process for adding the new browser element will be described in greater detail herein below.

In the depicted embodiment, the first browser element 510 is associated with the web resource Yandex search engine and, as such, depicted in FIG. 5 with a logo " Я ", in Russian. The second browser element 512 is associated with the web resource Yandex.Mail. The fourth browser element 516 is associated with the web resource Facebook social network web resource. The fifth browser element 518 is associated with the web resource Wikipedia and the sixth browser element 520 is associated with the web resource www.lenta.ru. One will appreciate that the web resources associated with the first browser element 510, the second browser element 512, the third browser element 514, the fourth browser element 516, the fifth browser element 518 and the sixth browser element 520 are the resources that the user has opened, as will be described in greater detail herein below.

It should be also noted how the content of the respective web resources gets from the web resource server 118 to the electronic device 102 is known in the art and will not be described here at much length.

If one were to contrast the depiction of the screen shot 400 and the screen shot 500, one would appreciate that the fifth browser element 518 has been actuated into the expanded state of the FIG. 5 from the collapsed state of FIG. 4. Therefore, it can be said that the user associated with the electronic device 302 has actuated the collapsed state indicator 440 of the fifth browser element 518 to expand the sub-elements associated with the fifth browser element 518. As can be seen in FIG. 5, the fifth browser element 518 has been expanded into a header browser element 530, a first browser sub-element 532, a second browser sub-element 534, a third browser sub-element 534, a fourth browser sub-element 536, a fifth browser sub-element 538.

The header browser element 530 looks much akin to the fifth browser element 418 without the collapsed state indicator 440. All of the first browser sub-element 532, the second browser sub-element 534, the third browser sub-element 534, the fourth browser sub-element 536 and the fifth browser sub-element 538 are associated with web resources within the domain of the web resource associated with the header browser element 530. In this example, the header browser element 530 being associated with the Wikipedia web resource, the first browser sub-element 532, the second browser sub-element 534, the third browser sub-element 534, the fourth browser sub-element 536 and the fifth browser sub-element 538 are associated with specific resources in the Wikipedia web resource.

More specifically, the first browser sub-element 532 is associated with the Wikipedia article on Kashub language. The second browser sub-element 534 is associated with the Wikipedia article on Afrikaans language. The third browser sub-element 534 is associated with the Wikipedia article on Pomaksky language. The fourth browser sub-element 536 is associated with the Wikipedia article on Bulgarian language. The fifth browser sub-element 538 is associated with the Wikipedia article on French language.

It is noted that the web resource associated with the first browser sub-element 532 is currently the active one—since it is this web resource that is presently being viewed by the user in the browsing window 402. Hence, the first browser sub-element 532 includes the active indicator 424. In the depicted embodiment, the active indicator 424 is implemented as a bar (color coded or not) at the lower portion of the sixth browser element 420. It is noted that the form factor for how the active indicator 424 is not particularly limited. As such, the active indicator 424 can me implemented as a bar at the top portion of the sixth browser element 420, a vertical bar on the left or right edges of the sixth browser element 420. Alternatively, the active indicator 420 can be implemented as a visual element representative of a check mark. Alternatively, the active indicator 424 can be implemented as a visual element depicting the letter "A" for "active" and the like. It should be noted that the active indicator 424 used for the browser sub-elements of FIG. 5 can be implemented differently from the active indicator 424 of the browser elements of FIG. 4, for example.

Now, it should be noted that the first browser sub-element 532, the second browser sub-element 534, the third browser sub-element 534, the fourth browser sub-element 536 and the fifth browser sub-element 538 are all associated with the specific single web resource domain or, in other words, specific parent resource—in this case, Wikipedia web resource. As such, the first browser sub-element 532, the second browser sub-element 534, the third browser sub-element 534, the fourth browser sub-element 536 and the fifth browser sub-element 538 are associated with respective resources on the Wikipedia web domain and, hence are represented by a unified browser element that can be either (i) collapsed into a single domain-level indicator, as is the case with the fifth browser element 418 in FIG. 4 or (ii) expanded into the respective sub-elements, as is the case with the first browser sub-element 532, the second browser sub-element 534, the third browser sub-element 534, the fourth browser sub-element 536 and the fifth browser sub-element 538 in FIG. 5. The process of expanding the browser element into browser sub-elements will be described in greater detail herein below.

It is noted that within the illustration of FIG. 5, the fifth browser element 518 is depicted as a cluster separated from the remainder of the browser element tab 508 by see through spaces (not numbered). Namely, the header browser element 530 is separated from the fourth browser element 516 by a see through space, while the fifth browser sub-element 538 is separated from the sixth browser element 520 by a see through space.

Therefore, according to embodiments of the present technology, the web resources associated with the same domain can be grouped together or, put another way, collapsed into a single graphic representation within the browser element tab 508 (or, in other words, a unified browser element). Accordingly, in some embodiments of the present technology, when the user requests a new web resource and it is determine that the user-requested new resource is associated with the same domain as a resource already opened within the browser application 304, the browser application 304, instead of creating a separate element within the browser element tab 508, the browser application 304 creates a sub-element within the existing element within the browser element tab 508.

As can be seen from the illustration of the FIG. 4 and FIG. 5, the ability to (i) group the header browser element 530, the first browser sub-element 532, the second browser sub-element 534, the third browser sub-element 534, the fourth browser sub-element 536 and the fifth browser sub-element 538 based on their belonging to the single domain and (ii) collapse them into the single graphical object (the fifth browser element 418 of FIG. 4) allows to significantly save the real restate of the screen of the electronic device 302 that is otherwise dedicated to the various control panels of the browser application 304. More particularly, when one compares the browser elements tab 408 of FIG. 4 and the browser elements tab 508 of FIG. 5, it is clear that the collapsing into the unified browser element allows to shorten the size of the browser elements tab 408 (collapsed state) compared to the browser elements tab 508 (expanded state).

In some embodiments of the present technology, the header browser element 530, the first browser sub-element 532, the second browser sub-element 534, the third browser sub-element 534, the fourth browser sub-element 536 and the fifth browser sub-element 538 are also colored in the color associated with the resource which they display. In this example, the first browser sub-element 532, the second browser sub-element 534, the third browser sub-element 534, the fourth browser sub-element 536 and the fifth browser sub-element 538 can be colored light grey color, the color associated with Wikipedia web resource.

Now, given the fact that the browser element tab 408, 508 floats within the browsing window 402, 502 means that in some embodiments, the content of the browsed web resource needs to be amended. In some embodiments, this amendment can be executed at the web resource server 318. In other embodiments, this amendment can be executed at the server 316. In yet other embodiments, this amendment can be executed locally, at the electronic device 102 by the browser application 304 or any other component of the electronic device 102.

This web resource amendment routine is particularly suitable for those web resources where content is located even at the very bottom of the page. Consider the illustration of FIG. 5, as an example. Let's say the article on Kashub language depicted in FIG. 5 was the whole content of the Wikipedia article on Kashub language. As the browser element tab 508 floats within the content of the browsing window 502, the last two lines of the Wikipedia article would be overlaid by the browser element tab 508 and, thus, be invisible to the user. As such, according to embodiments of the present technology, the web resource page can be amended to include, at its end, a few blank lines (or, otherwise, empty space or a space that contains no user-relevant content). Hence, once the amendment routine is executed, the page can be scrolled down and the browser element tab 508 would not interfere with the user enjoyment of the web resource, as the browser element tab 508 would be overlaying white space (i.e. space that has no user-relevant content).

Next, we will focus our attention on the process for adding or deleting one of the above referenced browser elements (such as one of the first browser element 410, the second browser element 412, the third browser element 414, the fourth browser element 416, the fifth browser element 418 and the sixth browser element 420) or one of the above referenced browser sub-elements (the first browser sub-element 532, the second browser sub-element 534, the third browser sub-element 534, the fourth browser sub-element 536 and the fifth browser sub-element 538).

Figure 6:
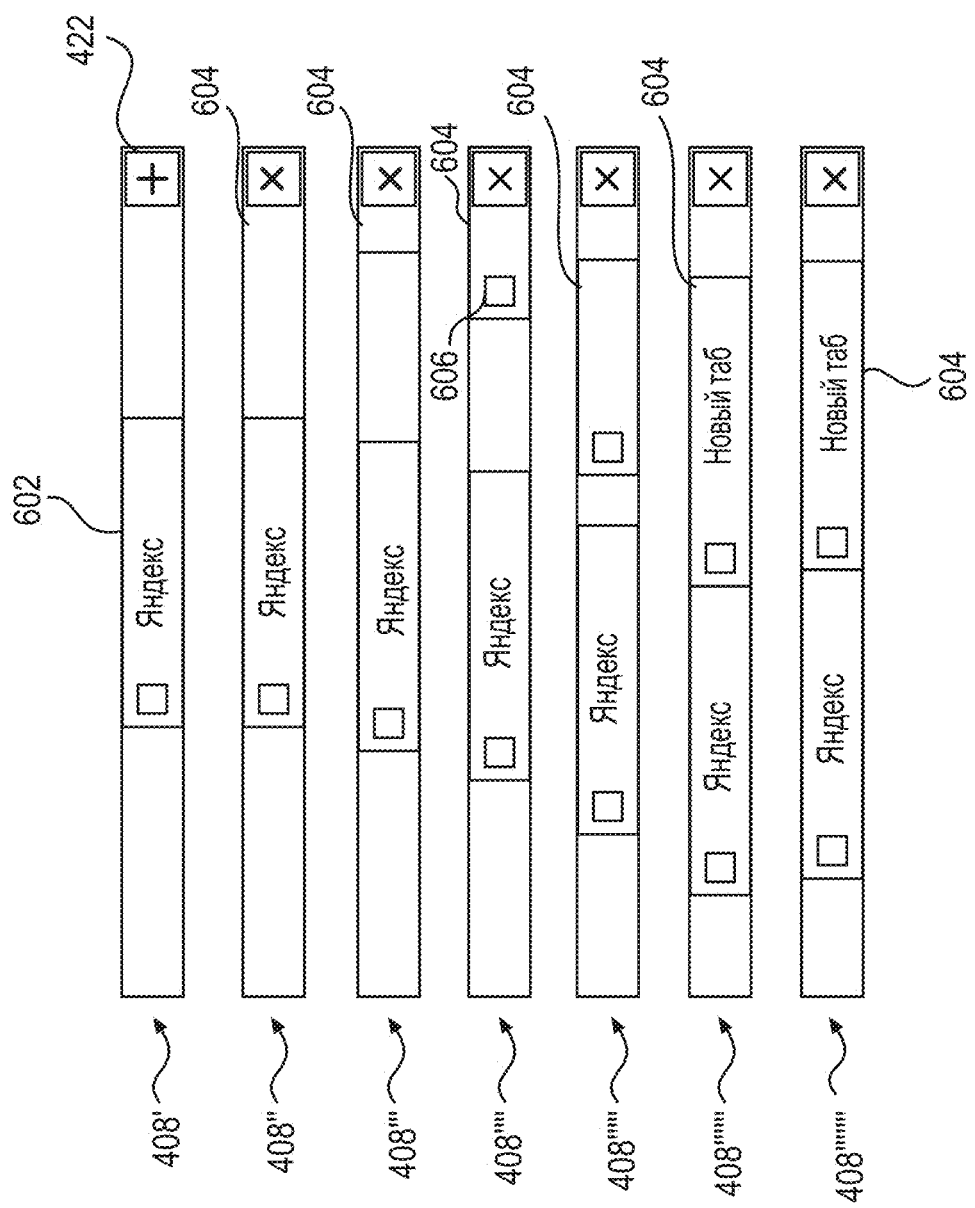
FIG. 6 depicts a portion of the browser element tab 408 during various staged of the process of adding a new browser element within the browser element tab 408.

With reference to FIG. 6, there is depicted a portion of the above-described browser element tab 408 during various staged of the process of adding a new browser element within the browser element tab 408. To that end, a browser element tab 408' is depicted at an instance of time before the user starts adding a new browser element. As such, the browser element tab 408' has a single instance of a browser element 602 and the add button 422. The browser element 602 is associated with Yandex search engine web resource and, as such, is depicted to read " Яндскс ", in Russian.

The browser element tab 408" is depicted at a point in time when the user has indicated her desire to add a new browser element. This can be done for example by the user either clicking on a link to open a new web resource from the web resource associated with the browser element 602 (scenario with a known new web resource) or actuating the add button 422 (scenario with an unknown new web resource) and, as such, a new browser element 604 started to appear, through animation, as floating from the right (as viewed in the orientation of FIG. 6). Only a portion of the new browser element 604 is visible, the one depicting an "X" symbol used for closing the new browser element 604.

The browser element tab 408''' is depicted at a point in time when the new browser element 604 continues to float from the right towards the browser element 602. Needless to say, in alternative embodiments, the animation can be executed in another direction.

The browser element tab 408'''' is depicted at a point in time when the new browser element 604 continues to float from the right towards the browser element 602. At this point a schematically depicted resource logo 606 (akin to the web resource logo 426). Within the scenario with the known new resource, the resource logo 606 can be obtained from cache of the electronic device 302 or the web resource server 118 associated with the new web resource. Within the scenario with the unknown new resource, the resource logo 606 can be shown as a pseudo-logo, such as a predetermined logo or the like.

The browser element tab 408''''' is depicted at a point in time when the new browser element 604 continues to float from the right towards the browser element 602. At this point of time, a semi-transparent indication of the web resource associated with the new browser element 604 starts to show. Within the scenario with the known new resource, the title of the new web resource can be obtained from cache of the electronic device 302 or the web resource server 118 associated with the new web resource. Within the scenario with the unknown new resource, the title of the new web resource can be shown as a pseudo-title. Within this illustration, the title of the new browser element 604 shows as " Новый Таб ", in Russian.

The browser element tab 408'''''' is depicted at a point in time when the new browser element 604 has almost completed its path of travel towards the browser element 602. At this point of time, the new browser element 604 is colored into the appropriate background color, as has been described above. Within the scenario with the known new resource, the background color can be obtained from cache of the electronic device 302 or the web resource server 118 associated with the new web resource. Within the scenario with the unknown new resource, the background color can be chosen from a pre-defined list of background colors.

The browser element tab 408''''''' is depicted at a point in time when the new browser element 604 has completed its path of travel towards the browser element 602. Within some embodiments, especially with the larger number of opened tabs within the browser element tab 408''''''', the new browser element 604 and the browser element 602 may need to be repositioned within the browser element tab 408 and/or resized.

In some embodiments of the present technology, the complete journey of the new browser element 604 can take 0.8 seconds, however, other time spans are also possible.

Once (or while) the new browser element 604 has appeared (is appearing) within the browser element tab 408, the browsing window 402 is changed from the web resource that was previously shown there to the new web resource. Within the scenario with the known new resource, the browsing window 402 shows the new web resource obtained from the cache of the electronic device 302 or obtained from the web resource server 118 associated with the new web resource.

Figure 10:
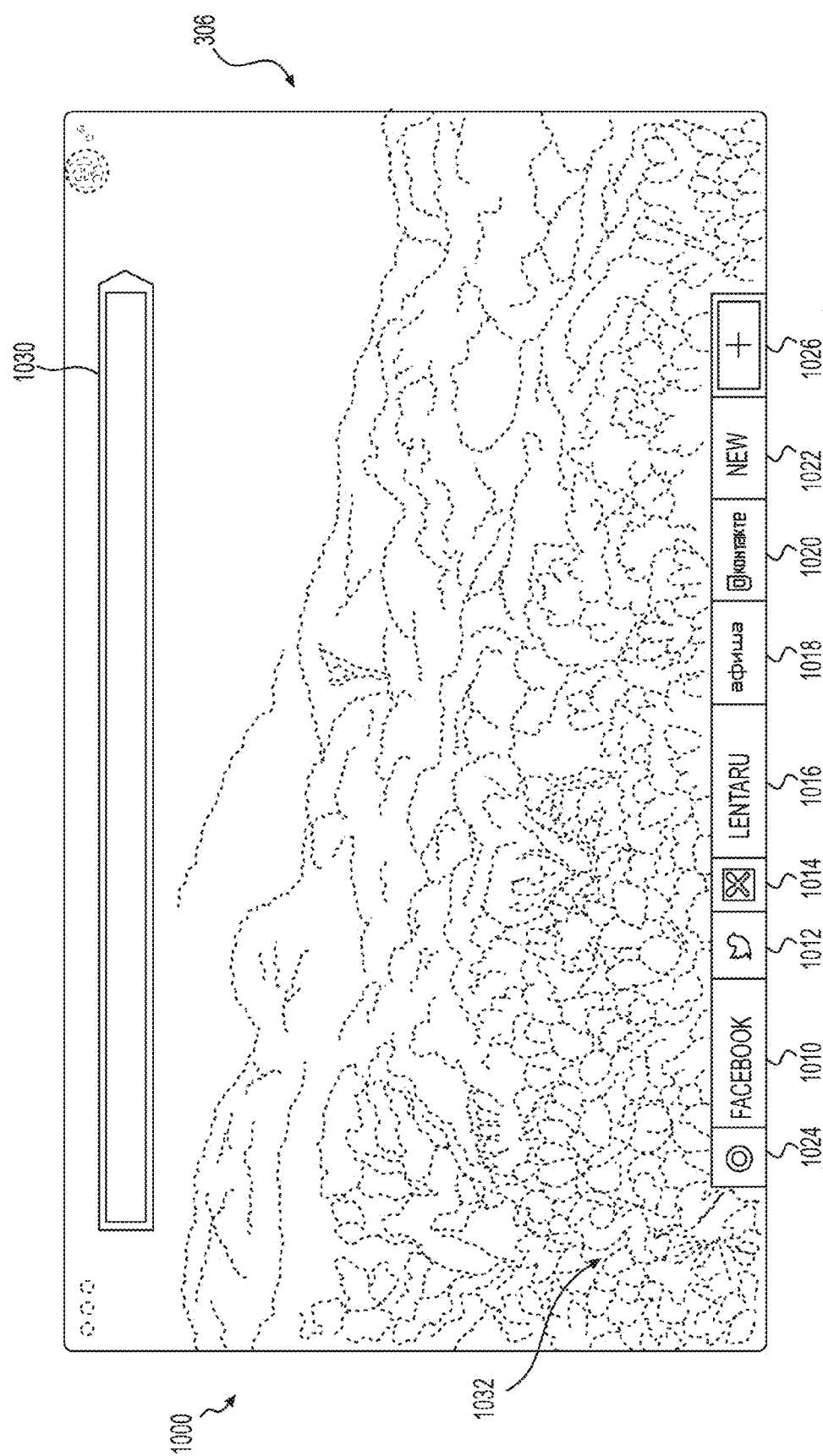
FIG. 10 depicts a screen shot 1000, which illustrates another non-limiting embodiment of the browser application 304 implemented according to embodiment of the present technology.

Within the scenario with the unknown new resource, the browsing window 402 shows a predefined omnibox page to enable the user to enter (or copy paste) the URL of the new web resource. An example of the omnibox page is depicted with reference to FIG. 10. FIG. 10 depicts a screen shot 1000, which illustrates another non-limiting embodiment of the browser application 304 implemented according to embodiment of the present technology. Specifically, screen shot 1000 shows the browser application 304 in the omnibox mode.

According to various non-limiting embodiments of the present technology, the user-browser interface 306 of FIG. 10 comprises a browser elements tab 1008. In the depicted embodiment, the browser element tab 1008 comprises a first browser element 1010, a second browser element 1012, a third browser element 1014, a fourth browser element 1016, a fifth browser element 1018, a sixth browser element 1020 and a seventh browser element 1022. It should be noted that the exact number of the elements within the browser element tab 1008 is not limited to the ones shown here.

There is also provided an add button 1026 and close all button 1024. The add button 1022 can be implemented as substantially described above with reference to the add button 422, 522. The close all button 1024 can be used to close all of the browser elements within he browser elements tab 1008.

In the depicted embodiment, the first browser element 1010 is associated with the web resource Facebook. The second browser element 1012 is associated with the web resource Twitter. The fourth browser element 1016 is associated with the web resource for Reiffesen bank. The fifth browser element 1018 is associated with the web resource www.lenta.ru. The sixth browser element 1020 is associated with the web resource VKontakte. Finally, the seventh browser element 1022 is associated with a new web resource requested by the user, for example, by actuating the add button 1026. Therefore, the seventh browser element 1020 is depicted with the title "NEW".

There is also provided an omnibox bar 1030. As has been previously alluded to, the omnibox bar 1030 can allow the user to enter an URL, to copy/paste the URL or to perform a search.

The user browser interface 306 can further be provided with a background image 1032. The background image 1032 can be associated with the provider of the browser application 306. The background image 1032 can be a promotional message associated with the provider of the browser application 306. The background image 1032 can be selected by the user.

Once the user types in (or copies and pastes) an URL associated with the web resource she desires to view, the browser application 304 can execute some or all of: (i) request the web resource from the associated web resource server 318 or retrieve the web resource from local cache; (ii) display the web resource; (iii) change the title associated with the seventh browser element 1020 to be associated with the web resource and/or change the logo associated with the seventh browser element 1020 to be associated with the web resource; and (iv) change the color associated with the seventh browser element 1020 to be associated with the web resource.

Figure 7:
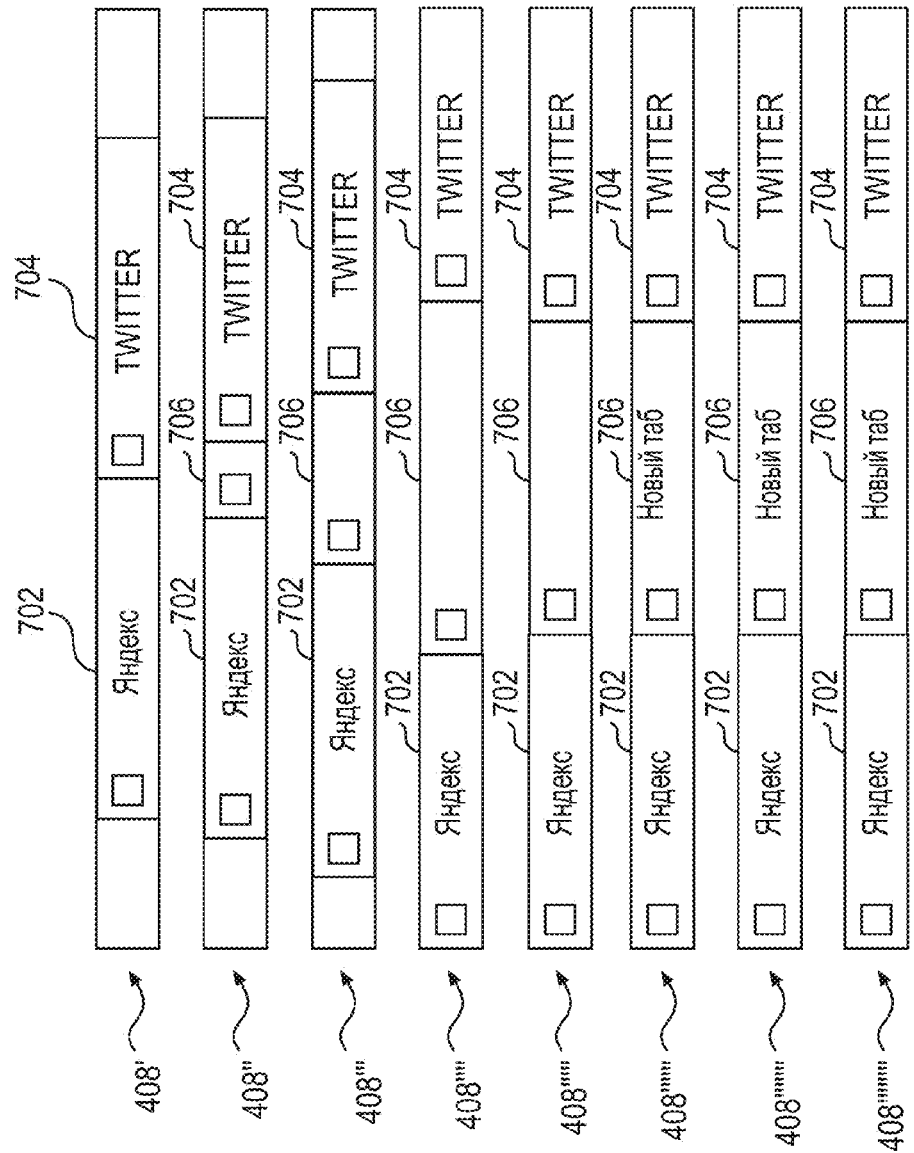
FIG. 7 depicts a portion of the browser element tab 408 during various staged of the process of adding a new browser element within the browser element tab 408, the process for adding the new browser element being implemented in accordance with an alternative embodiment of the present technology.

With reference to FIG. 7, there is depicted a portion of the above-described browser element tab 408 during various staged of the process of creating a new browser element within the browser element tab 408, the process for creating the new browser element being implemented in accordance with an alternative embodiment of the present technology.

To that end, a browser element tab 408' is depicted at an instance of time before the user starts adding a new browser element. As such, the browser element tab 408' has a first browser element 702 and a second browser element 704. The browser element 702 is associated with Yandex search engine web resource and, as such, is depicted to read " Яндекс ", in Russian and the second web browser 704 is associated with the Twitter web resource.

The browser element tab 408'' is depicted at a point in time when the user has either clicked on a link to open a new web resource from the web resource associated with the first browser element 602 or the second browser element 602 or has actuated the add button (which is not depicted in FIG. 7 for the sake of simplicity) and, as such, a new browser element 704 started to appear, through animation, as growing between the first browser element 702 and the second browser element 704. Only a portion of the new browser element 704 is visible, the one depicting a schematic portion of the web resource logo (akin to the web resource logo 426). Naturally, it will be appreciated that the first browser element 702 and the second browser element 704 are effectively floating apart, pushed apart by the new browser element 706.

The browser element tab 408''', browser element tab 408'''', browser element tab 408''''' are depicted at the consecutive points in time during the new browser element 604 continuing to grow and push aside the first browser element 702 and the second browser element 704. Within the illustration of the browser element tab 408''''', the new browser element 604 has reached the full size and the placement of the new browser element 604, the first browser element 702 and the second browser element 704 has taken its final placement.

The browser element tab 408'''''' is depicted at a point in time when the new browser element 604 has reached its final size and placement and the title of the web resource associated with the new browser element 604 is starting to appear. Within this illustration, the title of the new browser element 604 shows as " Новый Таб ", in Russian.

The browser element tab 408''''''' is depicted at a point in time when the title of the web resource associated with the new browser element 604 has reached its final placement within the new browser element 604.

The browser element tab 408'''''''' is depicted with the new browser element 604 (with the associated title), the first browser element 702 and the second browser element 704 are in the final placement within the browser element tab 408'''''''' after the new web resource associated with the new web element 702 has been opened.

Figure 8:
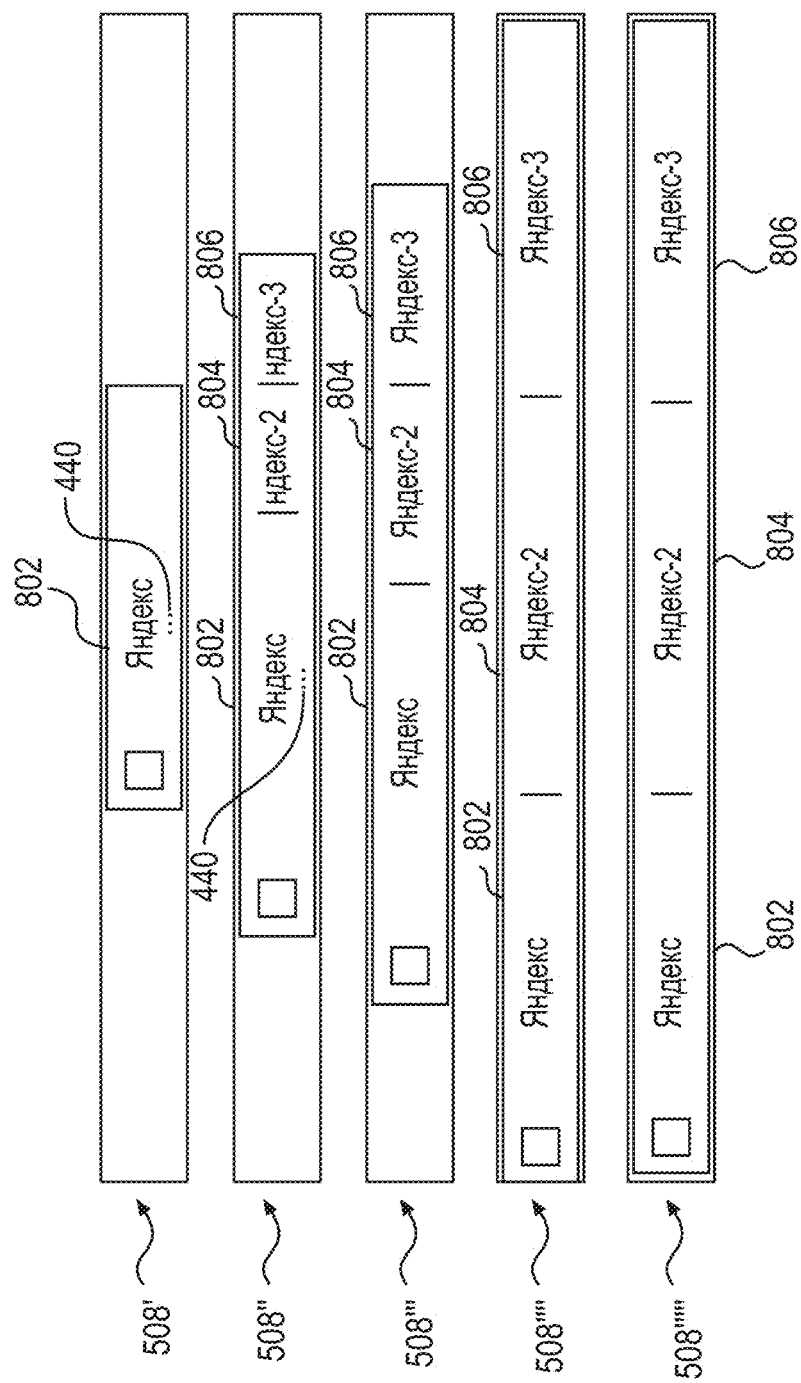
FIG. 8 depicts a portion of the browser element tab 508 during various staged of the process of expanding the browser element into browser sub-elements, the process of expanding into browser sub-elements being implemented in accordance with an embodiment of the present technology.

With reference to FIG. 8, there is depicted a portion of the above-described browser element tab 508 during various staged of the process of expanding the browser element into browser sub-elements (as has been described above), the process of expanding into browser sub-elements being implemented in accordance with an embodiment of the present technology.

To that end, a browser element tab 508' is depicted at an instance of time before the user has indicated her desire to expand a browser element 802 to its browser sub-elements. The browser element 802 is associated with Yandex search engine domain and, as such, is depicted to read " Яндекс ", in Russian. It is noted that the browser element 802 includes the aforementioned collapsed state indicator 440 indicative of the fact that the browser element 802 is in the collapsed state and is representative of several web resources associated with the same single domain.

The browser element tab 508'' is depicted at a point in time when the user has actuated the collapsed state indicator 440, hence, indicating her desire to expand the browser element 802. As such, a first browser sub-element 804 and a second browser sub-element 806 started to appear, through animation, as appearing/floating to the right of the browser element 802.

Only a respective portion of the first browser sub-element 804 and the second browser sub-element 806 is visible within the browser element tab 508''. The respective visible portion of the first browser sub-element 804 and the second browser sub-element 806 depict the respective titles of the respective web resources associated with the first browser sub-element 804 and the second browser element 804. In the depicted embodiment, first browser sub-element 804 is associated with a first Yandex search engine web resource and, as such, is depicted to read " Яндекс -1", in Russian and the second browser sub-element 806 is associated with a second Yandex search engine web resource and, as such, is depicted to read " Яндекс -2", in Russian.

Within the browser element 508", the depiction of the collapsed state indicator 440 starts to become partially see through.

The browser element tab 508''' is depicted during the time when the first browser sub-element 804 and the second browser sub-element 806 continue to appear to the right of the browser element 802. Within the illustration of the browser element tab 508''', the first browser sub-element 804 and the second browser sub-element 806 are proportionately smaller than the browser element 802. In some embodiments, the first browser sub-element 804 and the second browser sub-element 806 can stay proportionately smaller compared the browser element 802.

In other embodiments, as is depicted with the browser element tab 508'''' the first browser sub-element 804 and the second browser sub-element 806 continue to grow in size, until they are proportionately the same size as the browser element 802.

The browser element tab 508''''' depicts the final size and placement of the browser element 802, the first browser sub-element 804 and the second browser sub-element 806. It is noted that within the illustrated embodiment, only the browser element 802 is associated with a web resource logo (akin to the web resource logo 426), while the first browser sub-element 804 and the second browser sub-element 806 do not include one. In alternative implementations, all of the browser element 802, the first browser sub-element 804 and the second browser sub-element 806 can be associated with the web resource logo (akin to the web resource logo 426).

Needless to say that if the browser element tab 508' had more than one instance of the browser element 802, the appearance of the first browser sub-element 804 and the second browser sub-element 806 would push towards the right any other browser elements potentially present in the browser element tab 508' (just akin to the process that was described in reference to FIG. 7 in respect to the appearance of a new browser element).

Furthermore, if the user were to click on the browser element 802 within the browser element tab 508''''' (indicating her desire to collapse the browser element 802 and its associated sub-elements), the process with reference to FIG. 8 would be reversed.

Figure 9:
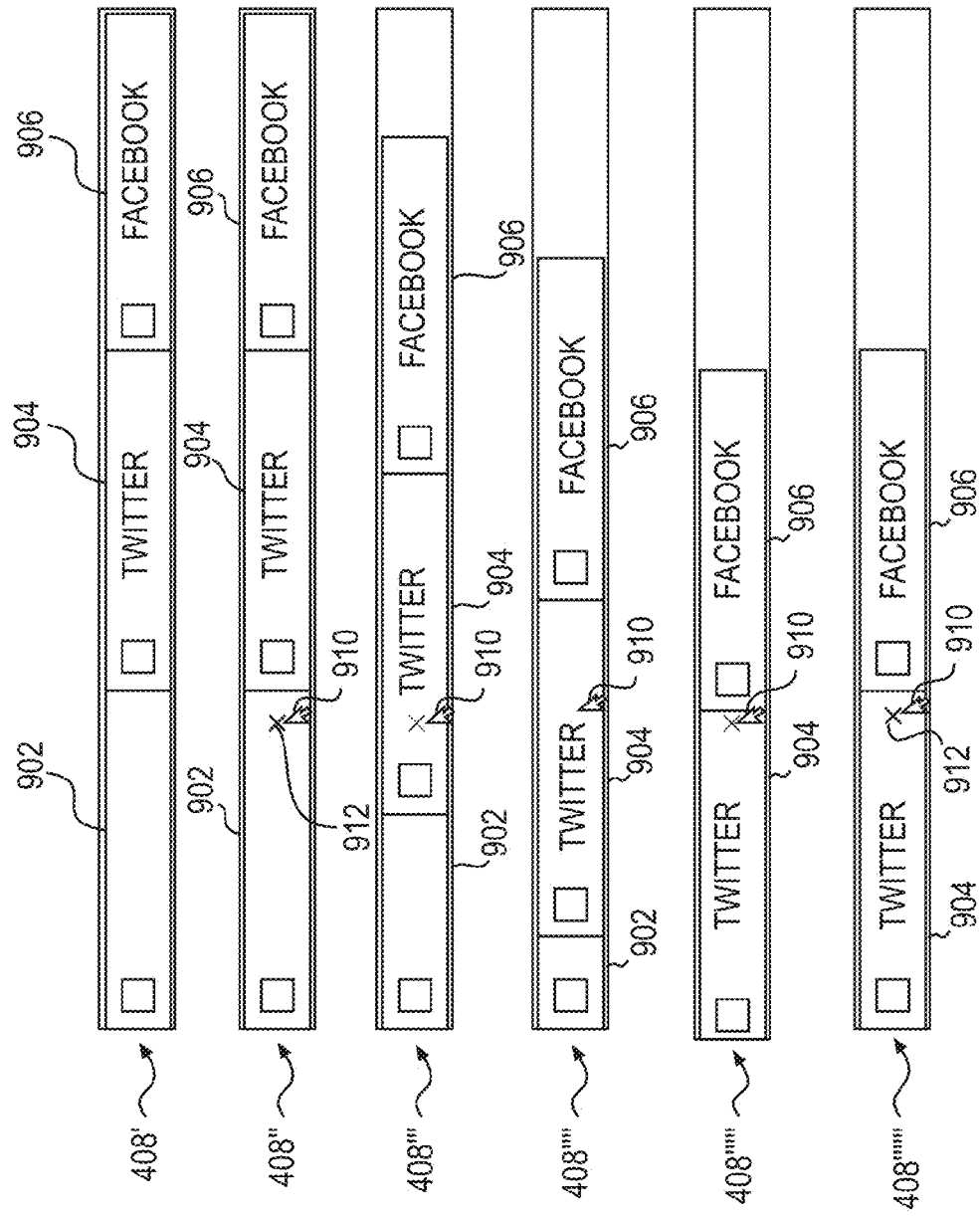
FIG. 9 depicts a portion of the browser element tab 408 during various staged of the process of closing one of the opened browser elements within the browser element tab 408, the process for closing one of the opened browser elements being implemented in accordance with an embodiment of the present technology.

With reference to FIG. 9, there is depicted a portion of the above-described browser element tab 408 during various staged of the process of closing one of the opened browser elements within the browser element tab 408, the process for closing one of the opened browser elements being implemented in accordance with an embodiment of the present technology.

To that end, a browser element tab 408' is depicted at an instance of time before the user starts removing one of the opened browser elements. As such, the browser element tab 408' has a first browser element 902, a second browser element 904 and a third browser element 906. The first browser element 902 is associated with Yandex search engine web resource and, as such, is depicted to read " Яндекс ", in Russian. The second browser element 904 is associated with the Twitter web resource. The third browser element 906 is associated with the Facebook web resource.

The browser element tab 408'' is depicted at a point in time when the user has decide to close one of the opened browser elements, namely the first browser element 902. To that end, the user can hover a cursor 910 over the first browser element 902, at which point a closing element 912 appears. In the depicted embodiment, the closing element 912 is implemented as an "X" sign, but any other graphical object can be user instead. Upon the user clicking (or otherwise actuating) the closing element 912, the process of closing the first browser element 902 starts.

The browser element tab 408''' is depicted at a point of time, when the first browser element 902 starts to disappear, by animation, by means of the second browser element 904 and the third browser element 906 moving to the left, with the second browser element 904 starting to overlap a portion of the first browser element 904.

The browser element tab 408'''' is depicted at a point of time, when the first browser element 902 continues to disappear, with the second browser element 904 and the third browser element 906 continuing to move to the left, with the second browser element 904 continuing to overlap the majority of the first browser element 904.

The browser element tab 408''''' is depicted at a point of time, when the first browser element 902 has completely disappeared, with the second browser element 904 and the third browser element 906 completed their move to the left, with the second browser element 904 completely overlapped the first browser element 904.

Since the cursor 910 is now hovering over the second browser element 904, the associated closing element 912 has appeared on the second browser element 904. If the user were to click or otherwise actuate the closing element 912, the closing process described above would repeat for the second browser element 904.

Now it should be expressly understood that exact placement of the browser element tab 408, 508 is not particularly limited. As such, even though in the illustrations of FIGS. 4 and 5, the browser element tab 408, 508 is depicted in the lower-most central area of the browsing window 402,502, this does not need to be so in every embodiment of the present technology. As such, the browser element tab 408, 508 can be located at the top-portion of the browsing window 402, 502. Alternatively, the browser element tab 408, 508 can be located vertically towards the left or towards the right side of the browsing window 402, 502.

Also, even though the browser element tab 408, 508 is depicted touching the lower-most edge of the browsing window 402, 502; this also does not need to be so in every embodiment of the present technology. As such, in alternative embodiments, the browser element tab 408, 508 can float remote from the edge (either bottom, top, left or right) of the browsing window 402. 502.

Additionally, even though the respective elements of the browser element tab 408, 508 have been depicted as substantially rectangular buttons, this does not need to be so in every embodiment of the present technology. In some alternative embodiment of the present technology, the form factor of the browser element tab 408, 508 can be implemented differently, such as rounded edge rectangular button, oblong buttons, circular buttons and the like.

Additionally, even though the respective elements of the browser element tab 408, 508 have been depicted as substantially rectangular buttons nested closely to each other, this does not need to be so in every embodiment of the present technology. As such, in alternative embodiments of the present technology, there may be a space between two of the neighbouring ones of the browser element tab 408, 508, mush akin to the see through space provided between the header browser element 530 and the fourth browser element 516, as well as the fifth browser sub-element 538 and the sixth browser element 520.

Figure 11:
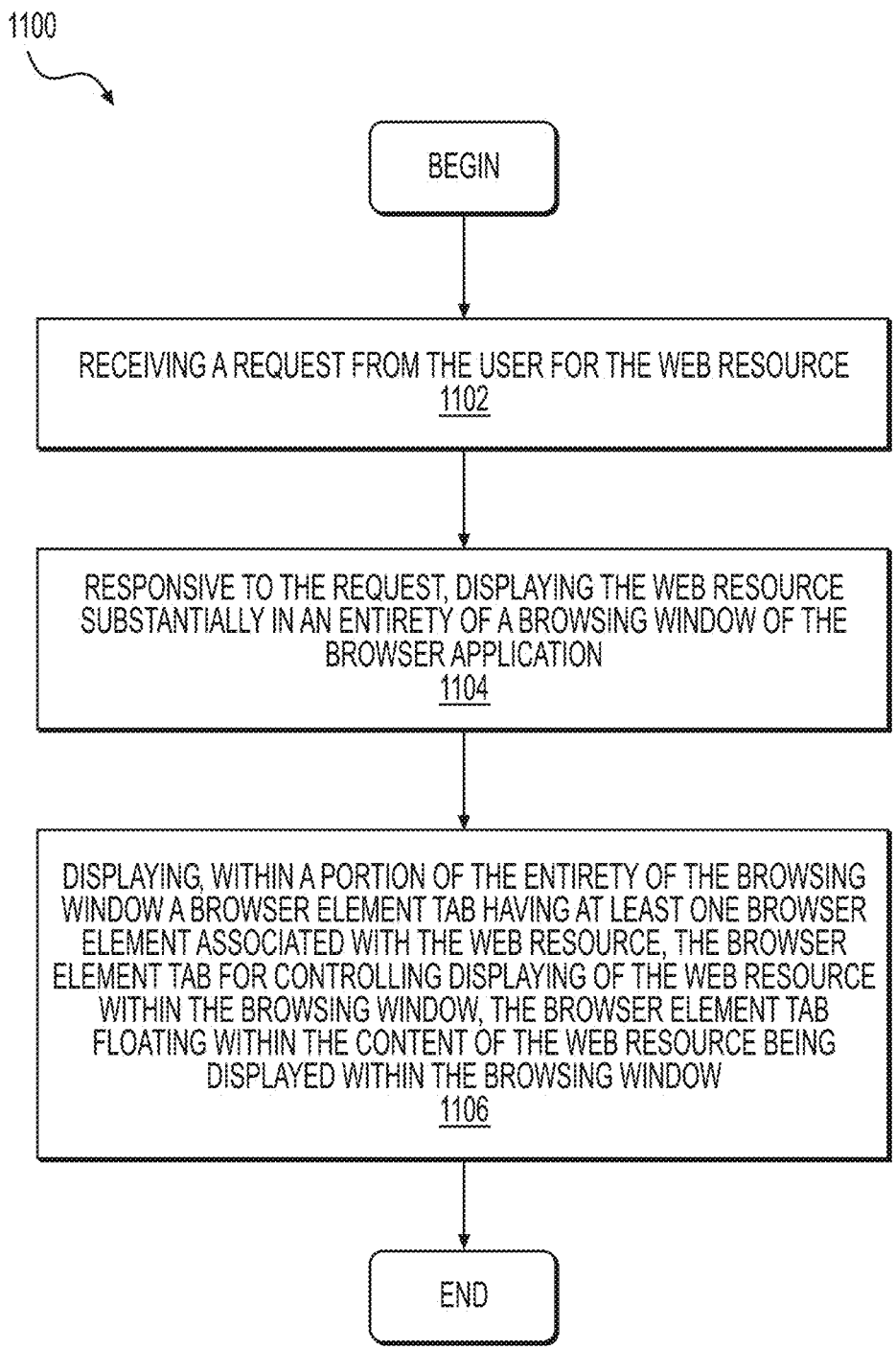
FIG. 11 depicts a block diagram showing a flow chart of a method 1100, the method 1100 being implemented according to embodiment of the present technology.

Given the architecture of FIG. 3 and the various examples provided above, a method of displaying a web resource can be executed. With reference to FIG. 11, there is depicted a flow chart of a method 1100, the method 1100 being executed according to embodiments of the present technology.

The method 1100 can be conveniently executed at the communication device 302. The method 1100 can be executed by the browser application 304 or by any other application or module or routine executed at the electronic device 302. To that end, the electronic device 302 can have a non-transient computer readable medium that contains computer executable instructions, which instructions when executed cause the electronic device 302 to execute the steps of the method 1100.

Step 1102—receiving a request from the user for the web resource

The method 1100 starts at step 1102, where the electronic device 302 receives a request from the user for the web resource.

As has been previously described the user can access a particular resource directly, either by typing an address of the resource (typically an URL or Universal Resource Locator, such as www.webpage.com) or by clicking a link in an e-mail or in another web resource. As such, step 1102 can be implemented by the browser application 304 receiving the address associated with the requested web resource from the user.

The method 1100 then proceeds to step 1104.

Step 1104—responsive to the request, displaying the web resource substantially in an entirety of a browsing window of the browser application Next, at step 1104, the electronic device 302 Step 1104, responsive to the request, displays the web resource substantially in an entirety of a browsing window of the browser application.

As part of step 1104, the browser application 304 obtains the content of the requested web resource. In some embodiments, the browser application 304 can retrieve the requested web resource from local cache (if it has been previously stored there). Alternatively, the browser application 304 can retrieve the requested web resource from the associated web resource server 318.

How the browser application 304 determines the associated address of the associated web resource server 318 and retrieves the requested web resource from the associated web resource server 318 is known in the art and, as such, will not be described here at any length.

The method 1100 then proceeds to step 1106.

Step 1106—displaying, within a portion of the entirety of the browsing window a browser element tab having at least one browser element associated with the web resource, the browser element tab for controlling displaying of the web resource within the browsing window, the browser element tab floating within the content of the web resource being displayed within the browsing window Next, at step 1106, the electronic device 302 displays, within a portion of the entirety of the browsing window a browser element tab 408 having at least one browser element 410 associated with the web resource, the browser element tab 408 for controlling displaying of the web resource within the browsing window 402, the browser element tab 408 floating within the content of the web resource being displayed within the browsing window 402.

More specifically and as has been described above, the browser application 304 can display the browser element tab 408 having at least one of the first browser element 410, the second browser element 412, the third browser element 414, the fourth browser element 416, the fifth browser element 418 and the sixth browser element 420.

The method 1100 can then loop back to step 1102 where another request for another web resource is received or, alternatively, the method 1100 can then terminate.

Figure 12:
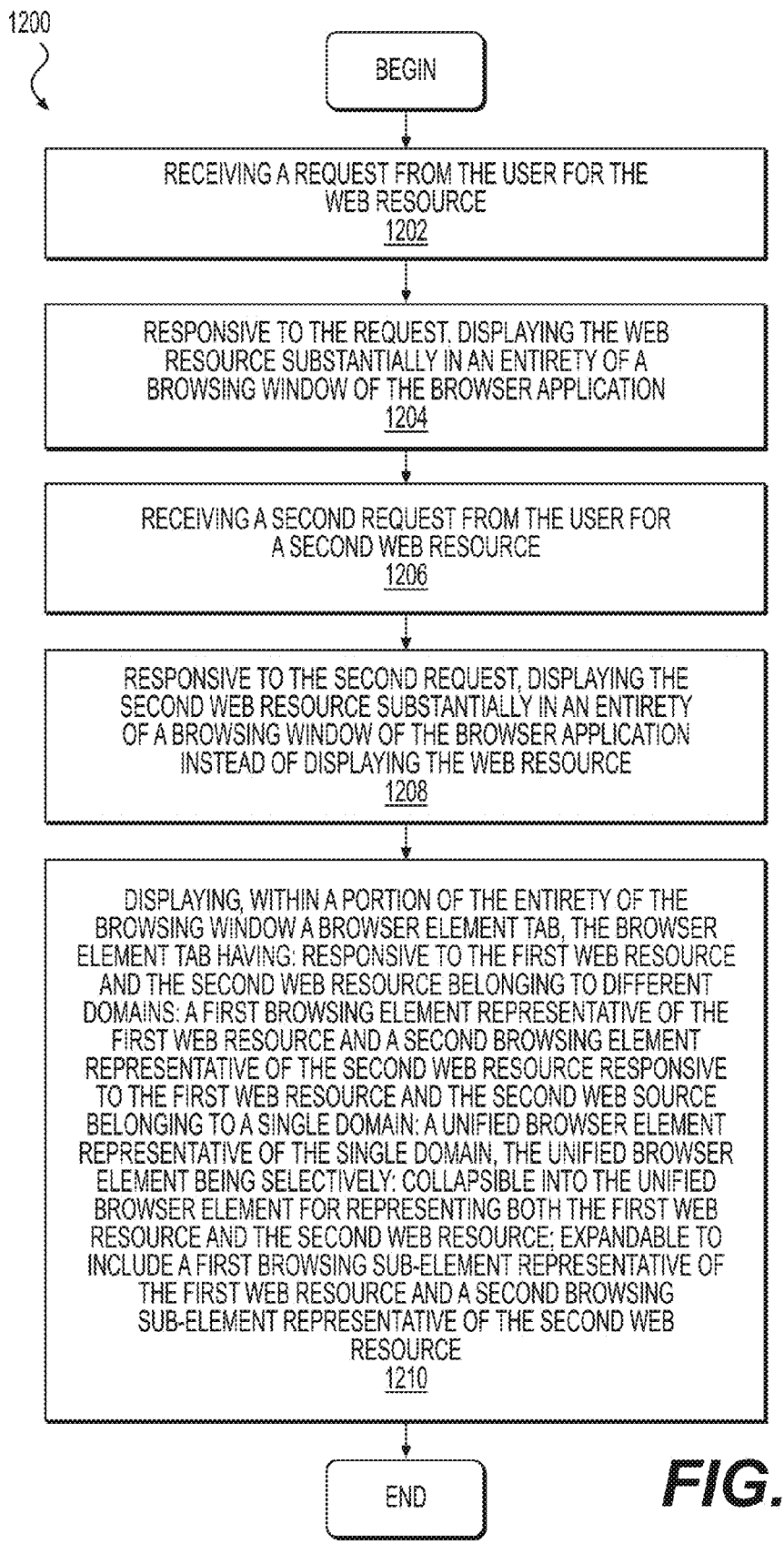
FIG. 12 depicts a block diagram showing a flow chart of a method 1200, the method 1200 being implemented according to another embodiment of the present technology.

Given the architecture of FIG. 3 and the various examples provided above, a method of displaying a web resource according to another non-limiting embodiment of the present technology can be executed. With reference to FIG. 12, there is depicted a flow chart of a method 1200, the method 1200 being executed according to another embodiment of the present technology.

The method 1200 can be conveniently executed at the communication device 302. The method 1200 can be executed by the browser application 304 or by any other application or module or routine executed at the electronic device 302. To that end, the electronic device 302 can have a non-transient computer readable medium that contains computer executable instructions, which instructions when executed cause the electronic device 302 to execute the steps of the method 1200.

Step 1202—receiving a request from the user for the web resource

The method 1200 begins at step 1202, the electronic device 302 receives a request from the user for the web resource.

As has been previously described the user can access a particular resource directly, either by typing an address of the resource (typically an URL or Universal Resource Locator, such as www.webpage.com) or by clicking a link in an e-mail or in another web resource. As such, step 1202 can be implemented by the browser application 304 receiving the address associated with the requested web resource from the user.

The method 1200 then proceeds to step 1204.

Step 1204—responsive to the request, displaying the web resource substantially in an entirety of a browsing window of the browser application Next, at step 1204, the electronic device 302, responsive to the request, displays the web resource substantially in an entirety of a browsing window 402 of the browser application 304.

As part of step 1204, the browser application 304 obtains the content of the requested web resource. In some embodiments, the browser application 304 can retrieve the requested web resource from local cache (if it has been previously stored there). Alternatively, the browser application 304 can retrieve the requested web resource from the associated web resource server 318.

How the browser application 304 determines the associated address of the associated web resource server 318 and retrieves the requested web resource from the associated web resource server 318 is known in the art and, as such, will not be described here at any length.

The method 1200 then proceeds to step 1206.

Step 1206—receiving a second request from the user for a second web resource Next, at step 1206, electronic device 302 receives a second request from the user for a second web resource.

As has been previously described the user can access a particular resource directly, either by typing an address of the resource (typically an URL or Universal Resource Locator, such as www.webpage.com) or by clicking a link in an e-mail or in another web resource. As such, step 1206 can be implemented by the browser application 304 receiving the address associated with the requested web resource from the user.

The method 1200 then proceeds to step 1208.

Step 1208—responsive to the second request, displaying the second web resource substantially in an entirety of a browsing window of the browser application instead of displaying the web resource Next, at step 1208, the electronic device 302, responsive to the second request, displays the second web resource substantially in an entirety of a browsing window 402 of the browser application 304 instead of displaying the web resource.

As part of step 1208, the browser application 304 obtains the content of the requested web resource. In some embodiments, the browser application 304 can retrieve the requested web resource from local cache (if it has been previously stored there). Alternatively, the browser application 304 can retrieve the requested web resource from the associated web resource server 318.

How the browser application 304 determines the associated address of the associated web resource server 318 and retrieves the requested web resource from the associated web resource server 318 is known in the art and, as such, will not be described here at any length.

The method 1200 then proceeds to step 1210.

Step 1210—displaying, within a portion of the entirety of the browsing window a browser element tab, the browser element tab having: responsive to the first web resource and the second web resource belonging to different domains: a first browser element representative of the first web resource and a second browser element representative of the second web resource responsive to the first web resource and the second web resource belonging to a single domain: a unified browser element representative of the single domain, the unified browser element being selectively: collapsible into the unified browser element for representing both the first web resource and the second web resource; expandable to include a first browser sub-element representative of the first web resource and a second browser sub-element representative of the second web resource Next, at step 1210, the electronic device 302 displays, within a portion of the entirety of the browsing window 402 a browser element tab 508, the browser element tab 508 having:

responsive to the first web resource and the second web resource belonging to different domains: a first browser element 412 representative of the first web resource and a second browser element 414 representative of the second web resource;

responsive to the first web resource and the second web resource belonging to a single domain: a unified browser element 440 representative of the single domain, the unified browser element 440 being selectively:

collapsible into the unified browser element 440 for representing both the first web resource and the second web resource;

expandable to include a first browser sub-element 532 representative of the first web resource and a second browser sub-element 534 representative of the second web resource.

More specifically, the browser application 304 can display to the user the browser element tab 508, which includes the fifth browser element 518 that can be selectively: (i) expanded to the sub-elements associated with the fifth browser element 518 (as depicted in FIG. 5) or (ii) collapsed into the unified browser element (as depicted in FIG. 4). As can be seen in FIG. 5, the fifth browser element 518 has been expanded into a header browser element 530, a first browser sub-element 532, a second browser sub-element 534, a third browser sub-element 534, a fourth browser sub-element 536, a fifth browser sub-element 538.

The method 1200 can loop back to step 1206 where a request for another web resource is received or, alternatively, can then terminate.

Figure 13:
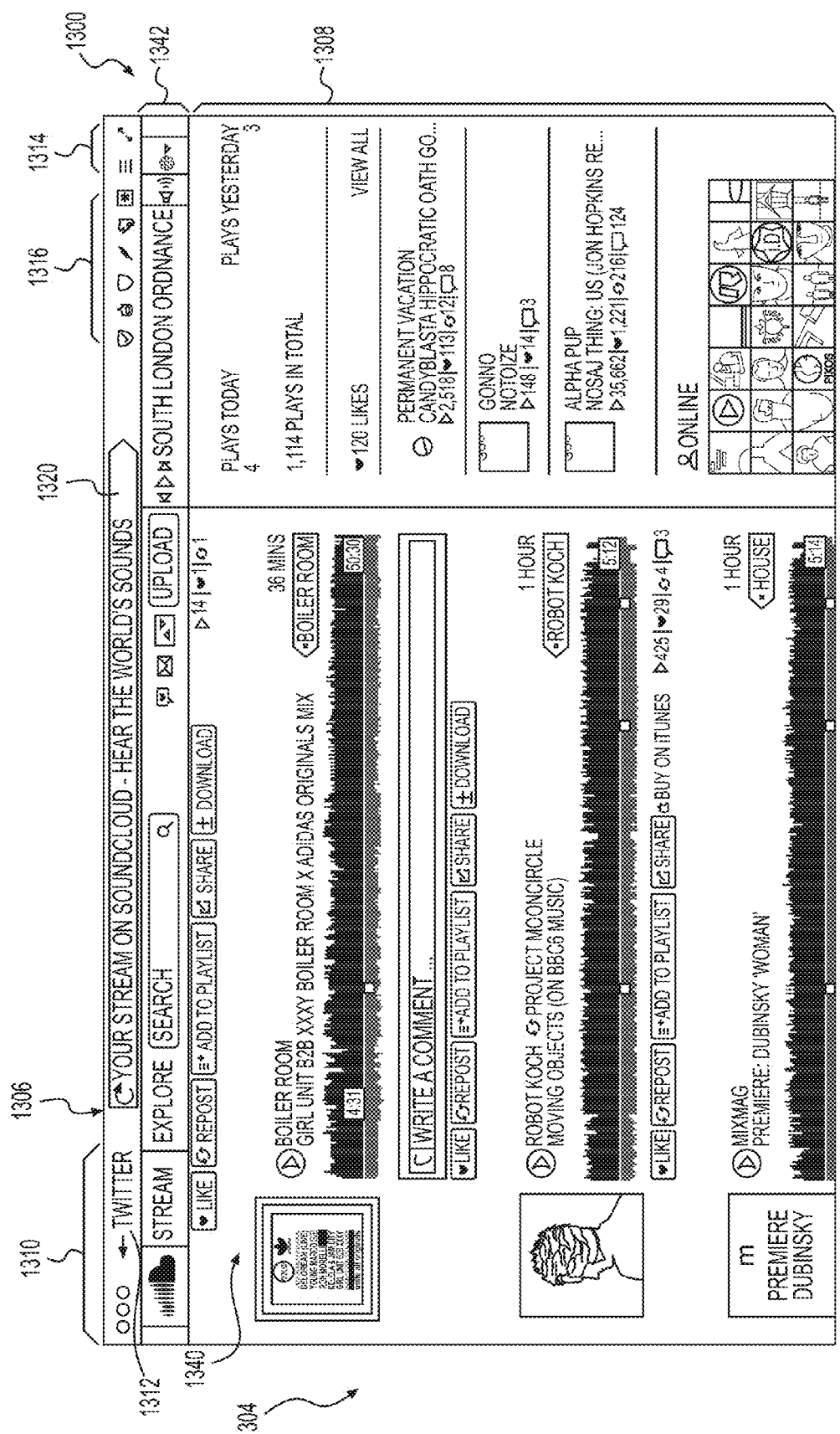
FIG. 13 depicts a screen shot 1300, which illustrates another non-limiting embodiment of the browser application 304.

FIG. 13 depicts a screen shot 1300, which illustrates another non-limiting embodiment of the browser application 304 implemented according to yet another embodiment of the present technology. The example browser application 304 of FIG. 13 can be executed on a Mac OS operating system device (such as a laptop or desktop).

The browser application 304, typically, has a command interface 1306 and a browsing interface 1308. The command interface 1306 includes a browser command buttons panel 1310. The browser command buttons panel 1310 including a number of control fields for controlling the browser application 304 and/or content being displayed therein. As an example, the browser command buttons panel 1310 includes a back button 1312. In the depicted embodiment, the back button 1312 is executed with an indication of a previously viewed resource to which the back button 1312 points to, which in this case includes Twitter web resource.

The command interface 1306 also includes a secondary control buttons 1314 for controlling appearance of the browser application 304 (such as the size of the browser application 304 window, etc). The browser command buttons panel 1310 further includes application icons area 1316. The application icons area 1316 is for displaying one or more active application icons associated with one or more third party extensions, plug ins and the like.

The command interface 1306 further comprises an omnibox 1320 incorporating functionality of the field for entering URLs and the field for entering search queries for the search engine associated with the browser application 304 to search.

It is noted that the omnibox 1320 is located within the command interface 1306. It is also noted that the omnibox 1320 is located in-line with the browser command buttons panel 1310 within the command interface 1306. It is further noted that the omnibox 1320 is located within the command interface 1306 in-between other objects associated with the command interface 1306. In this particular example, it is located in-between browser command buttons panel 1310 and application icons area 1316. However, other placement for the omnibox 1320 within the command interface 1306 is also possible.

In some embodiments of the present technology, the omnibox 1320 and the command interface 1306 are implemented in a partially see through manner. In other words, the omnibox 1320 and the command interface 1306 can be implemented in a semi-transparent matter in the sense that the content "displayed behind" the omnibox 1320 and the command interface 1306 can be at least partially seen.

In the illustration the browsing interface 1308 displays browsed content 1340 to the user, which in this example is a streaming service from Soundclod. The content of the browsed content 1340 is shown at the beginning thereof. If the user were to scroll the content down, a portion of the browsed content 1340 that would be behind the omnibox 1320 and the command interface 1306 would be semi-visible to the user.

It can be said that the browser command buttons panel 1310, the secondary control buttons 1314, the application icons area 1316 and the omnibox 1320 constitute an entirety of command buttons provided by the browser application 304 for enabling the user to control at least one of the browser application 304 and content being displayed in the browsing interface 1308.

Within the depicted embodiment, the browsed content 1340 also includes a content source control bar 1342. The content source control bar 1342 is, in a sense, part of the browsed content 1340 (even though it is a control panel for controlling the content of the browsed content 1340). Generally speaking, the content source control bar 1342 is provided by the same source as the content of the browsed content 1340. In the depicted embodiment, the content source control bar 1342 allows the user to select streaming, searching, uploading, playing, fast forwarding, rewinding and the like the content provided by the music service of the Soundclod. Naturally, the content source control bar 1342 can be omitted in other embodiments of the present technology.

As such, given the architecture of FIG. 3 and the examples provided above with reference to FIG. 13, a method of providing a browser application can be executed. The method can be executed according to embodiments of the present technology.

The method includes displaying, on a screen of the electronic device 102 a browser window, the browser window having: a command interface 1306 and a browsing interface 1308; the command interface 1306 including a browser command buttons panel 1310 for enabling the user to control at least one of the browser application and content being displayed in the browsing interface 1308; the command interface 1306 further including an omnibox 1320 located inline with the browser command buttons panel 1310. In other words, it can be said that the omnibox 1320 is located within the command interface 1306 in-between other objects associated with the command interface 1306. In this particular example, it is located in-between browser command buttons panel 1310 and application icons area 1316. However, other placement for the omnibox 1320 within the command interface 1306 is also possible.

In some implementations, displaying of at least a portion of the command interface 1306 is executed in a semi-transparent manner. In other embodiments, displaying of the entirety of the command interface 1306 is executed in the semi-transparent manner.

Given that a portion or the whole of the command interface 1306 can be displayed in a semi-transparent manner, the method further includes (i) receiving, via the omnibox 1320, a request from the user for the web resource; and (ii) responsive to the request, displaying the web resource substantially in an entirety of a browsing interface 1308. As a result, if the user were to provide a scroll request of the content (for example, by using scroll bar, which scroll bar is not depicted, but is very well known to those of skill in the art), the method further includes, responsive to the scroll request from the user, scrolling content of the web resource, a portion of the content located behind the command interface being at least partially visible to the user.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of displaying a web resource to a user in a browser application executed on an electronic device, the browser application configured to display content of the web resource on a user output interface of the electronic device at least partially in response to a request from the user received via a user input interface, the electronic device further including a network communication interface for two-way communication over a communication network; the method executable by the electronic device, the method comprising:
   receiving, via the user input interface, a first request from the user for a first web resource to be displayed in the browser application;
   obtaining, via the network communication interface, content of the first web resource;
   displaying the first web resource in an entirety of a browsing window of the browser application;
   receiving a second request from the user for a second web resource to be displayed in the browser application;
   obtaining, via the network communication interface, content of the second web resource;
   displaying the second web resource in the entirety of the browsing window of the browser application instead of displaying the first web resource;
   displaying, within a portion of the entirety of the browsing window, a browser element tab, the browser element tab for controlling displaying of the first web resource and the second web resource within the browsing window, the browser element tab having:
   responsive to the first web resource and the second web resource belonging to different domains:
      a first browser element representative of the first web resource and a second browser element representative of the second web resource;
   responsive to the first web resource and the second web resource belonging to a single domain:
      a unified browser element representative of the single domain, the unified browser element being selectively:
         collapsible into the unified browser element for representing both the first web resource and the second web resource;
         expandable to include a first browser sub-element representative of the first web resource and a second browser sub-element representative of the second web resource;
      responsive to receiving, via the user input interface, a third request from the user, the third request indicative of the user closing one of the first web resource and the second web resource, removing an associated browser element tab from being displayed within the browsing window.

2. The method of claim 1, further comprising augmenting one of the unified browser element and the second browser sub-element with an active indicator.

3. The method of claim 1, the first web resource and the second web resource belonging to the single domain, the method further comprising: responsive to the user expanding unified browser element, displaying the first browser sub-element and the second browser sub-element.

4. The method of claim 3, wherein said displaying the first browser sub-element and the second browser sub-element is executed by use of animation for a gradual appearance of the first browser sub-element and the second browser sub-element.

5. The method of claim 1, wherein the unified browser element is collapsible and expandable through animation for respective one of a gradual appearance of the first browser sub-element and the second browser sub-element and a gradual disappearance of the first browser sub-element and the second browser sub-element.

6. The method of claim 1, wherein responsive to the user selecting one of the first browser sub-element and the second browser sub-element, displaying to the user the respective first web resource and the second web resource.

7. The method of claim 6, further comprising augmenting the selected one of the first browser sub-element and the second browser sub-element with an indication of an active indicator.

8. The method of claim 1, the browser element tab floating within the content of the web resource being displayed within the browsing window.

9. The method of claim 8, wherein responsive to the user scrolling the content of one of the first web resource and the second web resource, the method further comprising scrolling content of the one of the first web resource and the second web resource around the browser element tab.

10. The method of claim 8, further comprising amending one of the first web resource and the second web resource with user non-relevant information at a bottom portion of the one of the first web resource and the second web resource.

11. The method of claim 10, wherein a height of the bottom portion is at least the same as a height of the browser element tab.

12. An electronic device comprising:
a user input interface for receiving user inputs;
a user output interface for providing at least one of visual and audible outputs to the user;
a network communication interface for two-way communication over a communication network; and
a processor coupled to the user input interface, the user output interface and the network communication interface, the processor being configured to have access to computer readable commands which commands, when executed, cause the processor to execute a browser application for displaying a web resource to the user via the user output interface, the commands being further configured to cause the processor to:
receive, via the user input interface, a first request from the user for a first web resource to be displayed in the browser application;
obtain, via the network communication interface, content of the first web resource;
display the first web resource in an entirety of a browsing window of the browser application;
receive, via the user input interface, a second request from the user for a second web resource to be displayed in the browser application;
obtain, via the network communication interface, content of the second web resource;
display the second web resource in the entirety of the browsing window of the browser application instead of displaying the first web resource;
display, within a portion of the entirety of the browsing window, a browser element tab, the browser element tab for controlling displaying of the first web resource and the second web resource within the browsing window, the browser element tab having:
responsive to the first web resource and the second web resource belonging to different domains:
a first browser element representative of the first web resource and a second browser element representative of the second web resource;
responsive to the first web resource and the second web resource belonging to a single domain:
a unified browser element representative of the single domain, the unified browser element being selectively:
collapsible into the unified browser element for representing both the first web resource and the second web resource;
expandable to include a first browser sub-element representative of the first web resource and a second browser sub-element representative of the second web resource;
the commands being further configured to cause the processor, responsive to receiving via the user input interface, a third request from the user, the third request indicative of the user closing one of the first web resource and the second web resource, to remove an associated browser element tab from being displayed within the browsing window.

13. The electronic device of claim 12, the commands being further configured to cause the processor to augment one of the unified browser element and the second browser sub-element with an active indicator.

14. The electronic device of claim 12, the first web resource and the second web resource belonging to the single domain, the commands being further configured to cause the processor, responsive to the user expanding unified browser element, to display the first browser sub-element and the second browser sub-element.

15. The electronic device of claim 14, wherein to display the first browser sub-element and the second browser sub-element, the commands are further configured to cause the processor to execute displaying the first browser sub-element and the second browser sub-element by use of animation for a gradual appearance of the first browser sub-element and the second browser sub-element.

16. The electronic device of claim 12, wherein the unified browser element is collapsible and expandable through animation for respective one of a gradual appearance of the first browser sub-element and the second browser sub-element and a gradual disappearance of the first browser sub-element and the second browser sub-element.

17. The electronic device of claim 12, the commands being further configured to cause the processor, responsive to the user selecting one of the first browser sub-element and the second browser sub-element, to display to the user the respective first web resource and the second web resource.

18. The electronic device of claim 17, the commands being further configured to cause the processor to augment the selected one of the first browser sub-element and the second browser sub-element with an indication of an active indicator.

19. The electronic device of claim 12, the browser element tab floating within the content of the web resource being displayed within the browsing window.

20. The electronic device of claim 19, the commands being further configured to cause the processor, responsive to the user scrolling the content of one of the first web resource and the second web resource, to scroll content of the one of the first web resource and the second web resource around the browser element tab.

21. The electronic device of claim 19, the commands being further configured to cause the processor to amend one of the first web resource and the second web resource with user non-relevant information at a bottom portion of the one of the first web resource and the second web resource.

22. The electronic device of claim 21, wherein a height of the bottom portion is at least the same as a height of the browser element tab.

23. A non-transient computer readable medium comprising computer executable instructions, which instructions when executed on an electronic device, cause the electronic device to execute a browser application, the browser application configured to display content of a web resource on a user output interface of the electronic device at least partially in response to a request from the user received via a user input interface, the electronic device further including a network communication interface for two-way communication over a communication network;

the browser application configured to:
receive, via the user input interface, a request from the user for a first web resource to be displayed in the browser application;
obtain, via the network communication interface, content of the first web resource;
display the web resource in an entirety of a browsing window of the browser application;
receive, via the user input interface, a second request from the user for a second web resource to be displayed in the browser application;
obtain, via the network communication interface, content of the second web resource;
display the second web resource in the entirety of the browsing window of the browser application instead of displaying the first web resource;
display, within a portion of the entirety of the browsing window, a browser element tab, the browser element tab for controlling displaying of the first web resource and the second web resource within the browsing window, the browser element tab having:
responsive to the first web resource and the second web resource belonging to different domains:
a first browser element representative of the first web resource and a second browser element representative of the second web resource;
responsive to the first web resource and the second web resource belonging to a single domain:
a unified browser element representative of the single domain, the unified browser element being selectively:
collapsible into the unified browser element for representing both the first web resource and the second web resource;
expandable to include a first browser sub-element representative of the first web resource and a second browser sub-element representative of the second web resource;
the browser application being further configured, responsive to receiving, via the user input interface a third request from the user, the third request indicative of the user closing one of the first web resource and the second web resource, to remove an associated browser element tab.

* * * * *